United States Patent
Gilboa-Amir et al.

(10) Patent No.: US 10,553,122 B1
(45) Date of Patent: Feb. 4, 2020

(54) UNMANNED AERIAL VEHICLE DATA COLLECTION FOR ROUTING

(71) Applicant: Amazon Technologies, Inc., Seattle, WA (US)

(72) Inventors: Asaf Gilboa-Amir, Seattle, WA (US); Jon T. Hanlon, Mercer Island, WA (US); Neil Whitney Woodward, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/077,637

(22) Filed: Mar. 22, 2016

(51) Int. Cl.
*G08G 5/00* (2006.01)
*B64C 39/02* (2006.01)
*G06Q 10/08* (2012.01)

(52) U.S. Cl.
CPC ............ *G08G 5/003* (2013.01); *B64C 39/024* (2013.01); *G06Q 10/0832* (2013.01); *G08G 5/0069* (2013.01); *B64C 2201/128* (2013.01)

(58) Field of Classification Search
CPC ............ B64C 2201/00; B64C 2201/02; B64C 2201/027; B64C 39/024; B64C 2201/128; G08G 5/003; G08G 5/0034; G08G 5/0039; G08G 5/0043; G08G 5/0069;
(Continued)

(56) References Cited

U.S. PATENT DOCUMENTS

| | | | | |
|---|---|---|---|---|
| 4,954,962 A | * | 9/1990 | Evans, Jr. ............. | G01C 21/00 180/169 |
| 5,040,116 A | * | 8/1991 | Evans, Jr. ............. | G01S 17/936 180/169 |
| 5,995,898 A | | 11/1999 | Tuttle | |

(Continued)

FOREIGN PATENT DOCUMENTS

CA    2739693 A1    11/2012

OTHER PUBLICATIONS

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

(Continued)

*Primary Examiner* — Richard A Goldman
(74) *Attorney, Agent, or Firm* — Arthorus, PLLC

(57) ABSTRACT

An automated system is provided that receives and utilizes travel related data from unmanned aerial vehicles ("UAVs") and other sources (e.g., data aggregators, weather services, obstacle databases, etc.) for optimizing the scheduling and routing of deliveries by UAVs. The travel related data that is received from the sensors of UAVs and other sources may indicate the locations and characteristics of obstacles, weather, crowds of people, magnetic interference, etc., (Continued)

which may be evaluated and utilized for determining and updating flight plans for UAVs. In various implementations, the travel related data received from the sensors of a UAV may be combined with other travel related data and stored (e.g., at a central management system, in UAVs, etc.) for further analysis and use in determining UAV delivery schedules and related operations of materials handling facilities.

21 Claims, 14 Drawing Sheets

(58) Field of Classification Search
CPC ...... G05D 1/0027; G05D 1/02; G05D 1/0202; G05D 1/0204; G06Q 10/0832
USPC ........ 701/2, 3, 23, 28, 15, 25, 26, 300, 408, 701/410, 423, 426
See application file for complete search history.

(56) References Cited

U.S. PATENT DOCUMENTS

| | | | |
|---|---|---|---|
| 6,795,823 B1* | 9/2004 | Aklepi | G06Q 10/08 707/781 |
| 7,339,993 B1 | 3/2008 | Brooks et al. | |
| 7,467,762 B1* | 12/2008 | Parsons | F42B 10/56 244/138 R |
| 7,673,831 B2 | 3/2010 | Steele et al. | |
| 7,946,530 B1 | 5/2011 | Talmage | |
| 8,511,606 B1* | 8/2013 | Lutke | B64C 39/028 244/100 R |
| 8,899,903 B1 | 12/2014 | Saad et al. | |
| 9,051,043 B1 | 6/2015 | Peeters et al. | |
| 9,079,587 B1 | 7/2015 | Rupp et al. | |
| 9,216,587 B2 | 12/2015 | Ando et al. | |
| 9,216,857 B1 | 12/2015 | Kalyan et al. | |
| 9,244,147 B1 | 1/2016 | Soundararajan et al. | |
| 9,336,506 B2 | 5/2016 | Shucker et al. | |
| 9,381,916 B1 | 7/2016 | Zhu et al. | |
| 9,704,409 B2* | 7/2017 | Prakash | B64C 39/024 |
| 9,743,239 B1* | 8/2017 | Mishra | H04W 4/023 |
| 9,997,080 B1* | 6/2018 | Chambers | G08G 5/045 |
| 10,395,543 B2* | 8/2019 | Chambers | |
| 2002/0156645 A1 | 10/2002 | Hansen | |
| 2003/0141411 A1 | 7/2003 | Pandya et al. | |
| 2003/0172007 A1* | 9/2003 | Helmolt | G06Q 10/06316 705/28 |
| 2007/0099627 A1* | 5/2007 | Kofol | G01S 1/30 455/456.1 |
| 2007/0168090 A1* | 7/2007 | DeMarco | G05D 1/104 701/23 |
| 2009/0236470 A1 | 9/2009 | Goossen et al. | |
| 2009/0314883 A1 | 12/2009 | Arlton et al. | |
| 2010/0017114 A1* | 1/2010 | Tehan | G01C 21/00 701/423 |
| 2010/0036599 A1 | 2/2010 | Froeberg et al. | |
| 2011/0035149 A1 | 2/2011 | McAndrew et al. | |
| 2011/0264311 A1* | 10/2011 | Lee | H04N 7/183 701/15 |
| 2013/0081245 A1 | 4/2013 | Vavrina et al. | |
| 2014/0022055 A1 | 1/2014 | Levien et al. | |
| 2014/0032034 A1 | 1/2014 | Raptopoulos et al. | |
| 2014/0136414 A1 | 5/2014 | Abhyanker | |
| 2014/0149244 A1 | 5/2014 | Abhyanker | |
| 2014/0254896 A1 | 9/2014 | Zhou et al. | |
| 2015/0006005 A1 | 1/2015 | Yu et al. | |
| 2015/0069968 A1* | 3/2015 | Pounds | B60L 11/1818 320/109 |
| 2015/0102154 A1* | 4/2015 | Duncan | B64C 39/022 244/2 |
| 2015/0120094 A1* | 4/2015 | Kimchi | B64C 39/024 701/3 |
| 2015/0120126 A1* | 4/2015 | So | G01C 23/00 701/26 |
| 2015/0129716 A1 | 5/2015 | Yoffe | |
| 2015/0153175 A1* | 6/2015 | Skaaksrud | H04W 12/06 701/23 |
| 2015/0158599 A1 | 6/2015 | Sisko | |
| 2015/0175276 A1 | 6/2015 | Koster | |
| 2015/0183528 A1 | 7/2015 | Walsh et al. | |
| 2015/0185034 A1 | 7/2015 | Abhyanker | |
| 2015/0246727 A1 | 9/2015 | Masticola et al. | |
| 2015/0259078 A1 | 9/2015 | Filipovic et al. | |
| 2015/0317597 A1* | 11/2015 | Shucker | G06Q 10/083 235/375 |
| 2015/0332206 A1 | 11/2015 | Trew et al. | |
| 2015/0336668 A1* | 11/2015 | Pasko | B64C 39/024 701/2 |
| 2015/0339933 A1* | 11/2015 | Batla | G08G 5/0069 701/120 |
| 2015/0367850 A1 | 12/2015 | Clarke et al. | |
| 2015/0370251 A1* | 12/2015 | Siegel | G05D 1/0027 701/2 |
| 2016/0009413 A1 | 1/2016 | Lee et al. | |
| 2016/0016663 A1* | 1/2016 | Stanek | B60R 16/02 701/3 |
| 2016/0023778 A1 | 1/2016 | Zhao et al. | |
| 2016/0033966 A1 | 2/2016 | Farris et al. | |
| 2016/0068267 A1 | 3/2016 | Liu et al. | |
| 2016/0111006 A1* | 4/2016 | Srivastava | G08G 1/00 701/3 |
| 2016/0125740 A1* | 5/2016 | Pasko | G08G 5/0034 701/528 |
| 2016/0140851 A1* | 5/2016 | Levy | G08G 5/0069 701/3 |
| 2016/0144982 A1 | 5/2016 | Sugumaran | |
| 2016/0157414 A1* | 6/2016 | Ackerman | A01B 69/008 701/25 |
| 2016/0159496 A1 | 6/2016 | O'Toole | |
| 2016/0196525 A1* | 7/2016 | Kantor | G08G 5/0013 705/330 |
| 2016/0196756 A1* | 7/2016 | Prakash | B64C 39/024 701/3 |
| 2016/0216711 A1* | 7/2016 | Srivastava | G08G 5/0013 |
| 2016/0217694 A1* | 7/2016 | Batla | G08G 5/0034 |
| 2016/0219506 A1* | 7/2016 | Pratt | H04W 52/0209 |
| 2016/0236778 A1 | 8/2016 | Takayama et al. | |
| 2016/0247407 A1* | 8/2016 | Paczan | G08G 5/045 |
| 2016/0253908 A1* | 9/2016 | Chambers | B64C 39/024 701/2 |
| 2016/0257401 A1* | 9/2016 | Buchmueller | B64C 39/024 |
| 2016/0299233 A1 | 10/2016 | Levien et al. | |
| 2016/0328979 A1* | 11/2016 | Postrel | B64C 39/024 |
| 2016/0334229 A1 | 11/2016 | Ross et al. | |
| 2016/0378108 A1* | 12/2016 | Paczan | B64C 37/02 705/330 |
| 2017/0011333 A1* | 1/2017 | Greiner | G06Q 10/083 |
| 2017/0012697 A1* | 1/2017 | Gong | H04W 40/02 |
| 2017/0053169 A1* | 2/2017 | Cuban | H04N 7/185 |
| 2017/0075360 A1* | 3/2017 | Von Novak | G05D 1/042 |
| 2017/0110017 A1* | 4/2017 | Kimchi | B64C 39/024 |
| 2017/0131727 A1* | 5/2017 | Kurdi | G06Q 50/00 |
| 2017/0139421 A1* | 5/2017 | Lockwood | B60R 16/02 |
| 2017/0144757 A1* | 5/2017 | Hall | B64C 39/024 |
| 2017/0169713 A1* | 6/2017 | Gong | G06F 16/29 |
| 2017/0176194 A1* | 6/2017 | Gordon | G08G 5/0069 |
| 2017/0253325 A1* | 9/2017 | Zou | B64C 27/006 |
| 2017/0349282 A1* | 12/2017 | Thompson | B64C 39/024 |
| 2017/0372256 A1* | 12/2017 | Kantor | G08G 5/0013 |
| 2017/0374190 A1* | 12/2017 | Dowlatkhah | H04M 1/72533 |
| 2018/0002017 A1* | 1/2018 | Abeles | B64F 5/60 |
| 2018/0003965 A1* | 1/2018 | O'Toole | G08G 1/167 |
| 2018/0016005 A1* | 1/2018 | Srivastava | B64C 39/024 |
| 2018/0024271 A1* | 1/2018 | Koch | G01W 1/02 702/3 |
| 2018/0033312 A1* | 2/2018 | DeLuca | G08G 5/0008 |
| 2018/0038695 A1* | 2/2018 | Bitra | G08G 5/0069 |
| 2018/0059659 A1* | 3/2018 | Takeuchi | G05D 1/0022 |
| 2018/0079530 A1* | 3/2018 | Wyrobek | B64C 39/024 |
| 2018/0253606 A1* | 9/2018 | Dhua | G05D 1/0094 |
| 2019/0035288 A1* | 1/2019 | Beltman | G08G 5/0069 |
| 2019/0043465 A1* | 2/2019 | Cordourier Maruri | H04R 3/00 |

(56) References Cited

U.S. PATENT DOCUMENTS

2019/0066041 A1* 2/2019 Hance .................... B65G 1/137
2019/0135403 A1* 5/2019 Perry .................... B64C 39/024
2019/0185162 A1* 6/2019 Prager .................... B64D 1/08

OTHER PUBLICATIONS

DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.
Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

* cited by examiner

US 10,553,122 B1

UNMANNED AERIAL VEHICLE DATA COLLECTION FOR ROUTING

BACKGROUND

Unmanned aerial vehicles are continuing to increase in use. For example, unmanned aerial vehicles are often used for surveillance. There is also discussion of electronic-commerce retailers, and other entities, delivering items directly to a user's home using unmanned aerial vehicles. Unmanned aerial vehicles used by hobbyists often rely completely on receipt of control signals from a user-operated remote control device. Thus, these unmanned aerial vehicles rely on a user to provide most or all navigational instructions. More advanced unmanned aerial vehicles may determine some navigational instructions without direct input. These unmanned aerial vehicles may receive high level instructions (such as waypoints, a destination, and/or other parameters), and may implement logic to navigate through airspace based on the high level instructions and other information accessed by sensors on the unmanned aerial vehicles. With regard to the navigation, certain factors (e.g., changing weather, unexpected obstacles, etc.) may have varying levels of impact on the ability of some unmanned aerial vehicles to perform specified tasks, such as travelling along a predetermined route to deliver a package within an expected timeframe.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
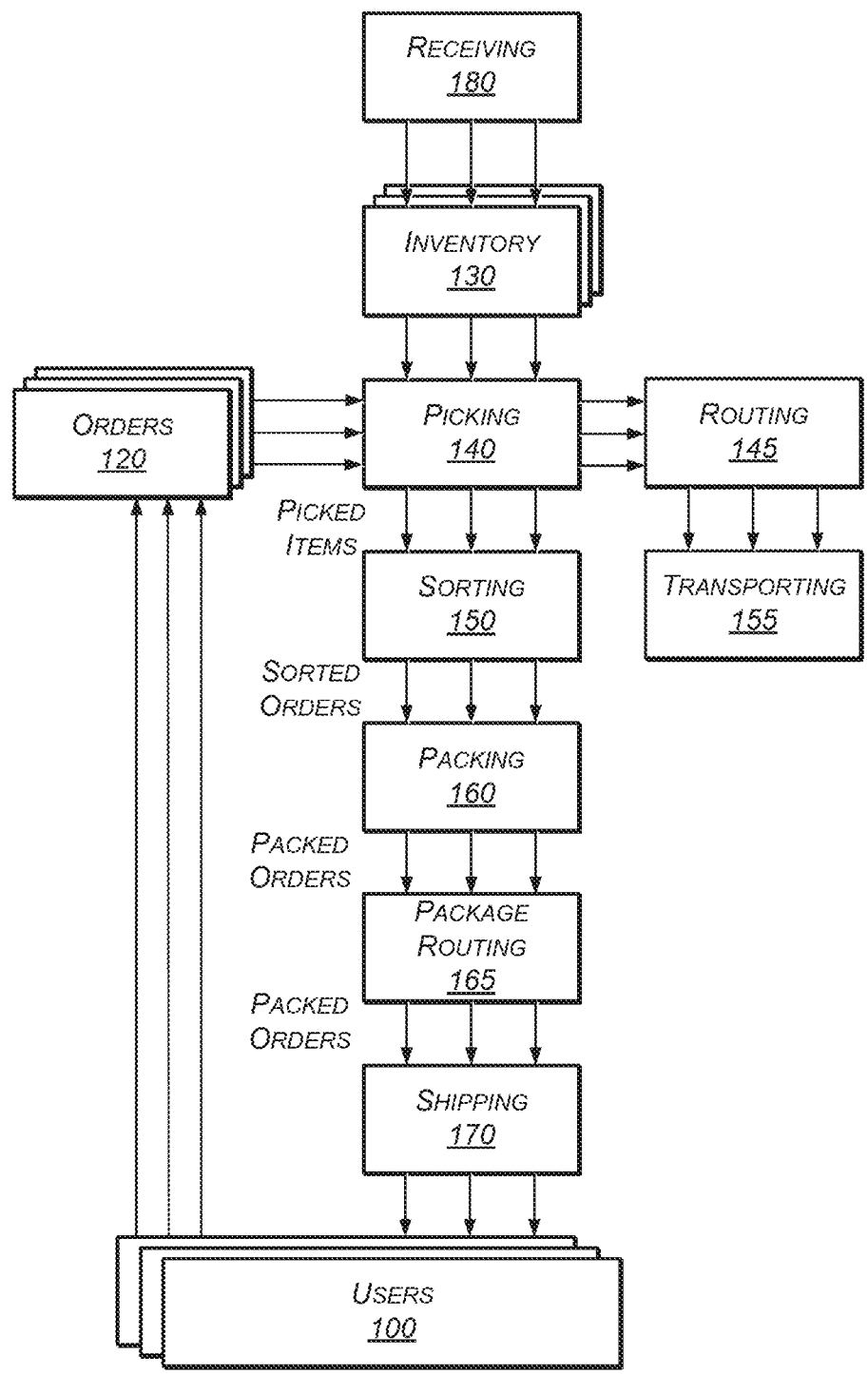
FIG. 1 illustrates a broad view of the operation of a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes an automated system that receives and utilizes travel related data from unmanned aerial vehicles ("UAVs") and other sources (e.g., data aggregators, weather services, obstacle databases, etc.) for optimizing the scheduling and routing of deliveries by UAVs. The travel related data that is received from the sensors of UAVs and other sources may indicate the locations and characteristics of obstacles, weather, crowds of people, magnetic interference, etc., all of which may be evaluated and utilized for determining and updating flight plans for UAVs. In various implementations, the data received from the sensors on a UAV may be combined with other travel related data (e.g., from other sources and/or other UAVs, etc.), and may be stored (e.g., at a central management system, in UAVs, etc.) for further analysis and use.

In various implementations, different types of travel related data may be sensed and collected by different sensors of a UAV. For example, an obstacle sensor (e.g., an image sensor, distance sensor, etc.) may be utilized for determining the presence of an obstacle (e.g., construction crane, new building, tree, etc.), for which data may be sensed and provided regarding GPS or other coordinates as indicating the location of the obstacle, physical characteristics regarding the size and/or shape of the obstacle, etc. As another example, weather sensors (e.g., wind speed sensors, precipitation sensors, etc.) may sense and provide travel related data regarding wind speed, direction, amount of precipitation, GPS or other coordinates regarding location, direction of movement, etc. The travel related data that is sensed and collected by a UAV may be shared with a central management system, other UAVs, other vehicles, and/or other entities. The UAV may also use this information locally, in combination with other received travel related data (e.g., for navigating a current travel route, etc.).

When a user places an order for one or more items to be delivered, a central management system may leverage travel related data to determine delivery times using different modes of delivery. One mode may be delivery using a UAV. The delivery times, choice of UAV, the UAV's useful load for the designated route, (or delivery time window) may be determined based at least in part on the travel related data. The central management system may schedule deliveries of items by different UAVs at different times based on the travel related data. Such schedules and other operations of a materials handling facility may be optimized over short and long time scales based on the travel related data.

Just prior to flight by a UAV that is to deliver an item, the UAV may receive a flight plan and/or other data to assist the UAV in delivering the item to a destination. The flight plan may be based on more recent travel related data than the travel related data used at the time of an order. The flight plan may avoid certain areas for which the travel related data indicates there are issues occurring (e.g., areas with recently discovered obstacles, areas with high magnetic interference, areas with low GPS signal strength, areas with large crowds of people, areas with inclement weather, etc.).

During flight, the UAV and/or a central management system may update a flight plan and/or create a new flight plan based on travel related data. In some implementations, the flight controller of the UAV may readily make control decisions based on the travel related data. As discussed herein, the update of a flight plan includes changes by the flight controller of the control decisions without necessarily establishing new waypoints, for example. Thus, the flight controller may make minor changes in heading based on the travel related data while continuing to navigate toward a predetermined waypoint or continuing to achieve other objectives in a flight plan.

In some instances, the UAV may land prior to reaching a planned destination in response to the travel related data, such as when the travel related data indicates an unsafe flying condition (e.g., large crowds, poor GPS signal strength, inclement weather, etc.). The UAV may then perform various actions to alert people and/or other devices about the landing. For example, the UAV may send a message to a user to alert the user when the flight is delayed or will arrive later than expected. The UAV may resume flight after receiving additional travel related data, which again may be received from the sensor(s) onboard the UAV and/or from external sources.

In some implementations, the travel related data may be leveraged to optimize or improve flight efficiency and/or safety. For example, a UAV may interact with a land-based vehicle to obtain transit to position the UAV in a safer or more energy efficient location (e.g., away from a crowd of people, upwind of a next waypoint that the UAV will fly toward, etc.). With regard to energy efficiency, a central management system may create flight plans for UAVs that favor travel in a direction that goes with a wind and disfavor travel in a direction that goes against a wind.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items may be delivered. For example, the delivery location may be a person's residence, a place of business, a location within a materials handling facility (e.g., packing station, inventory storage), any location where a user or inventory is located, etc. Inventory or items may be any physical goods that can be transported using a UAV.

A block diagram of a materials handling facility which, in one implementation, may be an order fulfillment facility configured to utilize various systems and methods described herein (e.g., with regard to the travel of UAVs for delivering items to users), is illustrated in FIG. 1. In this example, multiple users 100 may submit orders 120, where each order 120 specifies one or more items from inventory 130 to be shipped or otherwise delivered (e.g., by a UAV) to the user or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. The picking operation 140 may in various implementations be manual or automated (e.g., robotic). In some implementations, the items of a user order may be divided into multiple shipment sets for fulfillment by a planning service before fulfillment instructions are generated. As used herein, the term "shipment set" may refer to a single item of a user's order, multiple items of a user's order, or all items of a user's order.

In some instances, when a UAV, such as the UAV described below with respect to FIG. 4, has been designated for a delivery, the item(s) of one or more shipment sets may be picked at the picking operation 140 and sent to a routing operation 145. In various implementations, the UAVs may each include a unique identifier, such as a bar code, QR code, unique number, etc., to enable tracking, identification, and/or association of items to be carried by each UAV. For example, during a picking operation, an agent or automated system (e.g., robotic) within the materials handling facility may scan the bar code of the UAV or a container that the UAV will carry and/or scan a barcode or identifier of the picked item as the item is picked and/or placed into the UAV or container. Scanning of the UAV or container and/or the picked item may be utilized to associate and track the item with the UAV. As the UAVs and/or containers that the UAVs will carry are filled, the routing operation 145 may route the UAVs and/or container to an appropriate transporting operation 155 from which the UAVs may take off to fly toward a designated delivery location along a travel route.

In other examples, some picked items may be delivered to one or more stations in the order fulfillment facility for sorting 150 into their respective shipment sets and for packing 160 in shipping packages. A package routing operation 165 may sort orders for packing in shipping packages to one of two or more shipping operations 170, from which they may be shipped to the users 100. In various implementations, UAVs may be utilized for the shipping and may be considered as an alternative to shipping by traditional carriers. Depending on the specific implementation, the package routing operation 165 may be either automated or manual. The package routing operation 165 may receive an indication of the destination to which each packed shipment set should be routed from a central control system. In some instances, the destination may be the final destination identified by the user or a destination at which transfer of a shipment set may occur for final delivery to the user. The package routing operation 165 may also determine a routing destination for each packed shipment set dependent on the size of a shipping package in which the shipment set is contained and/or based on whether the shipment set will be delivered by a traditional carrier or a UAV.

The arrangement and order of operations illustrated by FIG. 1 is merely one example of many possible implementations of the operation of a materials handling facility, such as an order fulfillment facility, that enables fulfillment of user orders. Other types of materials handling, manufacturing, or order fulfillment facilities may include different, fewer, or additional operations and resources, according to different implementations.

Figure 2:
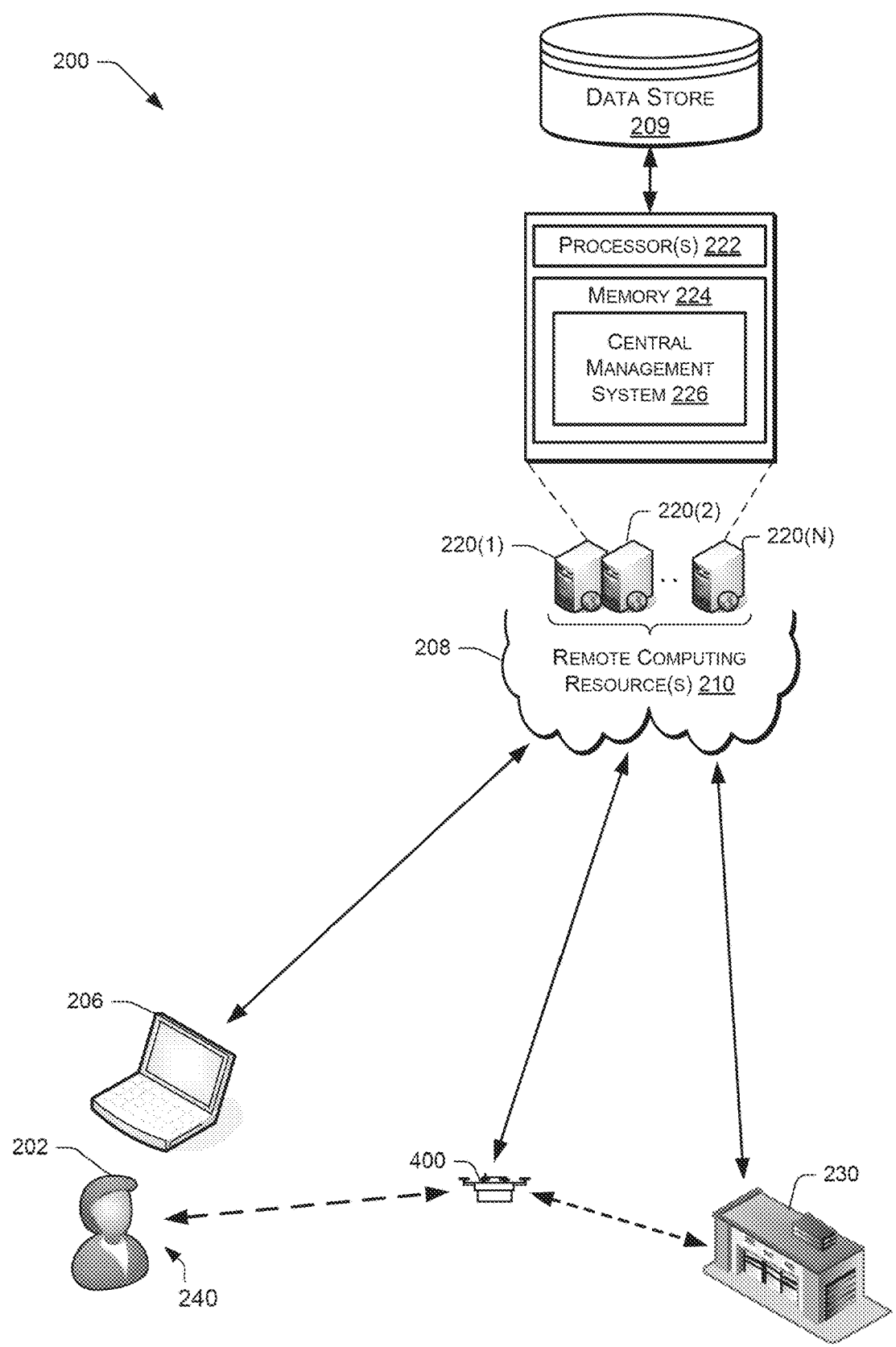
FIG. 2 depicts a block diagram of an unmanned aerial vehicle environment, according to some implementations.

FIG. 2 is a block diagram of an illustrative UAV environment 200 that includes a user interface that allows a user 202 to place an order for an item that will be transported by a UAV 400 to a delivery location (e.g., as will be described in more detail below with respect to FIG. 3). The user interface may be a graphical user interface, an audio only interface, a multi-mode interface, or any other interface for interacting with the user 202. The user interface may be provided to the user 202 through any type of electronic device 206, such as a tablet, desktop, laptop, smart phone, personal digital assistant, netbook, etc. The user interface may be delivered to the electronic device 206 by one or more remote computing resources 210 that make up part or all of an electronic commerce shopping environment. In other implementations, the user interface may be in direct communication between a user and an agent.

The remote computing resources 210 may form a portion of a network-accessible computing platform implemented as a computing infrastructure of processors, storage, software, data access, and other components that is maintained and accessible via a network 208. Services, such as e-commerce shopping services, offered by the remote computing resources 210 do not require that the user have knowledge of the physical location and configuration of the system that delivers the services. The electronic device 206 may communicatively couple to the remote computing resources 210 via the network 208 which may represent wired technologies (e.g., wires, USB, fiber optic cable, etc.), wireless technologies (e.g., RF, cellular, satellite, Bluetooth, etc.), and/or other connection technologies. The network 208 carries data between the electronic device 206 and the remote computing resources 210.

After receiving from a user 202 an order for an item that may be transported by a UAV 400 to a delivery location, the electronic device 206 may send this information to the remote computing resources 210 over the network 208. As illustrated, the remote computing resources 210 may include one or more servers, such as servers 220(1), 220(2) . . . 220(N). These servers 220(1)-(N) may be arranged in any number of ways, such as server farms, stacks, and the like that are commonly used in data centers. Furthermore, the servers 220(1)-(N) may include one or more processors 222 and memory 224 that may store a central management system 226. The central management system 226 may be configured, for example, to perform order planning and filling of UAVs 400 with orders (e.g., at a materials handling facility 230) and/or scheduling of deliveries by UAVs 400 to user specified delivery locations. In fulfilling orders that may be transported by a UAV, the materials handling facility 230 may fulfill orders using any of the processes discussed above with respect to FIG. 1.

The UAV 400 may communicatively couple to the remote computing resources 210 via the network 208. For example, the communications to and from the UAVs 400 may utilize wireless antennas of the UAVs. Communications may be to and from a control system of each of the UAVs (e.g., as described in more detail below with respect to FIG. 13).

The central management system 226 may also be configured, for example, to communicate with the UAVs 400. In various implementations, the general activities of UAVs 400, including those related to the travel of the UAVs to and from the designated delivery locations and the delivery and receiving of items by the UAVs, may be coordinated and/or otherwise controlled by the central management system 226. For example, the central management system 226 may determine travel routes for the travel of the UAVs 400 to the designated delivery locations, wherein the determination of the travel routes may be based at least in part on travel related data that is received from UAVs and other sources, as will be described in more detail below with respect to FIG. 3. In various implementations, the central management system 226 may send instructions to or otherwise control the UAVs 400 for delivering and/or receiving items, travelling between locations, recording and/or transmitting travel related data that has been sensed with the sensors of the UAVs, etc.

In various implementations, the remote computing resources 210 and/or central management system 226 may also receive tracking data (e.g., GPS) regarding the coordinates of the UAVs 400. The GPS data may be utilized for various purposes, such as including location data as part of the travel related data that is stored and/or transmitted, and/or for determining what travel related data is relevant to the travel of a UAV as per the UAV's current location, heading, speed, etc. The GPS data may also be utilized for answering location status requests or for sending notifications regarding the current locations of the UAVs 400, etc. For example, a user may request that a notification be sent when a UAV 400 with an ordered item is approaching. Notifications may also be sent from the UAV 400 to the remote computing resources 210 and/or central management system 226 regarding various events (e.g., when a UAV has taken off toward a destination, when a UAV has delivered an item, when a UAV is returning to a materials handling facility 230, in a case of an emergency landing, etc.).

Figure 3:
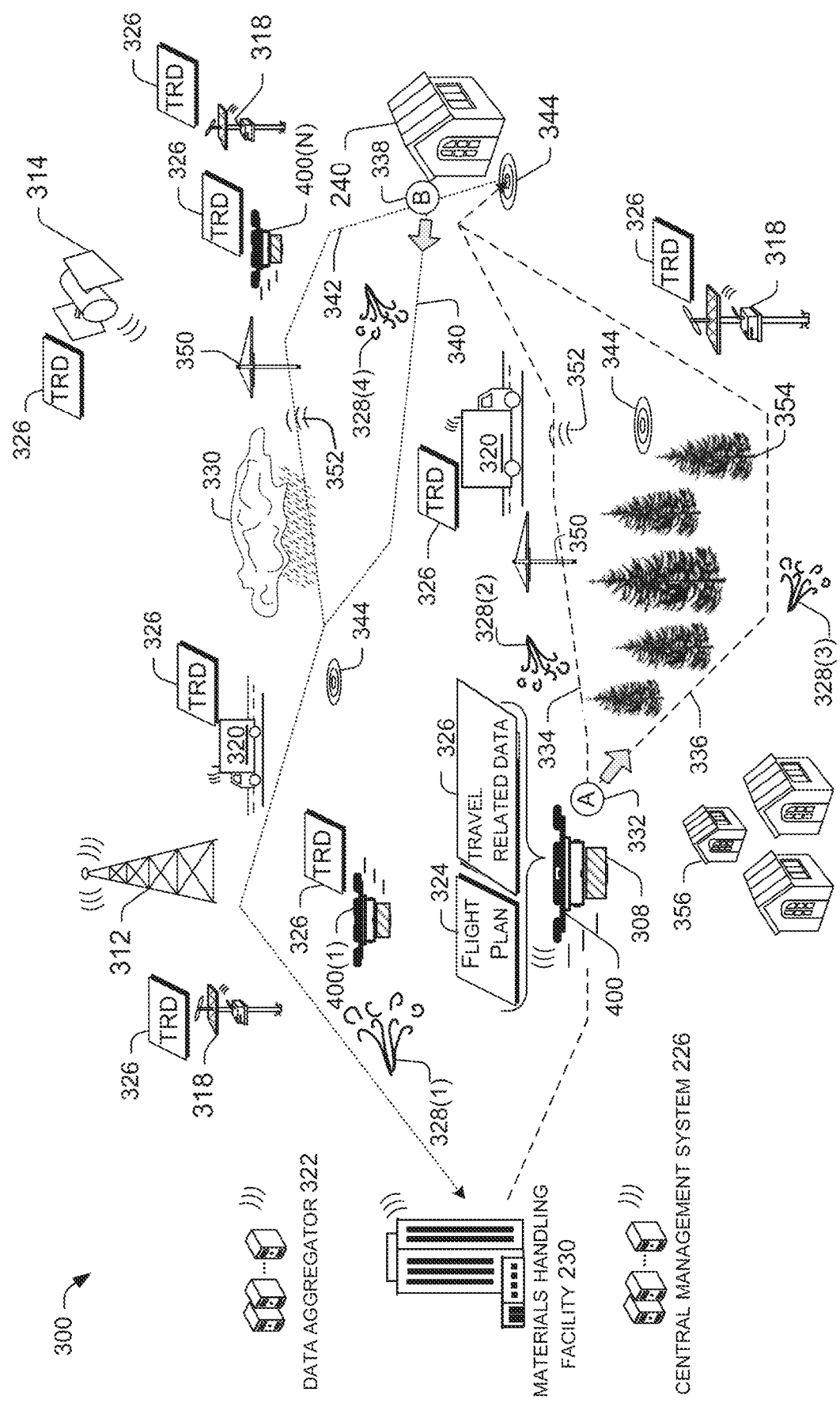
FIG. 3 depicts another block diagram of an unmanned aerial vehicle environment, according to some implementations.

FIG. 3 is a schematic diagram of an illustrative UAV environment 300 that includes a materials handling facility 230 where a UAV 400 may originate a flight. The flight may be directed to a destination 240, such as a location associated with a recipient of an item 308 that is transported by the UAV 400. The UAV 400 may receive at least some flight information and/or commands from a central management system 226. The central management system 226 may communicate with the UAV 400 via a wireless network (e.g., network 208), such as a network that utilizes one or more antennas 312 or satellites 314. The antennas 312 and satellites 314 may also provide other information, including travel related data to various devices. The UAV 400 may also, at times, conduct autonomous flights. In various implementations, at least some autonomous flights may be conducted during intervals between communications from the central management system 226 and/or when communication with the central management system 226 is not available. In some implementations, the antennas 312, such as cell towers, may include travel related data stations that leverage a short message service (SMS) backchannel or other communication channel to communicate the travel related data to other entities and/or vehicles, such as the UAV 400.

In various implementations, the UAV 400 may sense and collect (e.g., utilizing various onboard sensors) travel related data during flight. For example, an obstacle sensor (e.g., an image sensor, distance sensor, etc.) may be utilized for determining the presence of an obstacle (e.g., construction crane, new building, tree, etc.), for which travel related data may be sensed and provided regarding GPS or other coordinates indicating the location of the obstacle, physical characteristics regarding the size and/or shape of the obstacle, etc. As another example, weather sensors (e.g., wind speed sensors, precipitation sensors, etc.) may sense and provide travel related data regarding wind speed, direction, amount of precipitation, GPS or other coordinates regarding location, direction of movement, etc.

The travel related data that is sensed and collected by the UAV 400 may be shared with the central management system 226, other UAVs, other vehicles, and/or other entities. The UAV 4(X) may also use this information locally, as will be described in more detail below. In various implementations, the travel related data may improve travel route optimization by enabling planning of faster and more efficient travel routes for UAV's to follow. Certain techniques regarding the collection of real-time weather data for routing UAVs are also described in co-pending and commonly assigned U.S. patent application Ser. No. 14/975,547, entitled "Unmanned Aerial Vehicle Routing Using Real-Time Weather Data" filed on Dec. 18, 2015, which is hereby incorporated herein by reference in its entirety.

The UAV 400 may also exchange information with other UAVs 400(1)-400(N), such as travel related data collected from any of the UAVs 400(1)-400(N), as well as exchange information with other travel related data collection devices, either directly or indirectly (e.g., through the central management system 226, etc.). In various implementations, other travel related data collection devices may include local data collection stations 318, ground vehicles 320, data aggregators 322, etc. The local data collection stations 318 may in some instances collect travel related data regarding obstacles, weather, crowds, etc. For example, in instances where weather data is collected, the data collection stations 318 may include weather poles, weather balloons, and/or other devices that are stationed in the environment to directly sense and/or measure travel related data, such as wind speed, precipitation, fog or visibility, temperature, etc. In some instances, the local data collection stations 318 may also include other types of sensors (e.g., image sensors, distance detection sensors, etc.) for detecting other types of travel related data (e.g., regarding obstacles, crowds of people, GPS signal strength, etc.).

The ground vehicles 320 may include vehicles equipped with travel related data sensors that capture some travel related data, such as regarding obstacles, magnetic interference, wind speed, precipitation, fog or visibility, temperature, etc. In various implementations, the ground vehicles 320 may include land-based delivery vehicles or common-carrier vehicles that are used to deliver items to users. The data aggregators 322 may include resources or entities that combine travel related data from multiple inputs (e.g., from the local data collection stations, from UAVs and/or from the vehicles), to create travel related data forecasts and/or provide travel related data for a region. The data aggregators 322 may be data reporting companies, cloud computing data aggregators, and/or other entities. In various implementations, various types of travel related data that may be collected by data aggregators or other entities may include digital terrain elevation data (DTED), local obstacle mapping, sense and avoid (SAA), local magnetic deviation, GPS signal quality areas, weather data (e.g., current and forecast), etc.

It will be appreciated that travel related data that is received from UAVs may have various advantages. For example, a new obstacle 350 (e.g., a new construction crane) may be detected before updates on the presence of such an obstacle become publicly or otherwise available. This detection may be utilized to update an obstruction database. As another example, on board sensors of the UAV may be utilized to map geologic artifacts (e.g., magnetic disturbances due to ore deposits, etc.). Typically, such artifacts, disturbances, etc. are marked on various types of charts in a generic way, which may have less resolution or specificity than desired for planning flights of UAVs. In various implementations, additional data may be gathered by routing UAVs over such areas, for which the on board sensors of the UAVs may be utilized to measure the various deviations. Such measured deviations can be utilized to update the travel related data, which will allow subsequent UAVs flying in that area to take the deviations into account (e.g., for avoiding the areas, or generally being aware of the effect on various sensors in those areas, etc.). In various implementations, the travel related data may be automatically collected and utilized for various optimizations that may be performed over short or long timeframes (e.g., with respect to scheduling, routing, long term planning, etc. for a materials handling facility, or an overall distribution system, etc.).

The UAV 400 may include a flight plan 324, which may be initially created by the central management system 226 and/or by the UAV 400 prior to flight of the UAV. The flight plan 324 is stored in memory of the UAV 400 and causes the UAV to fly to the destination 240, such as by traveling through waypoints tracked by a global positioning system (GPS) receiver of the UAV, or by other navigation methods (e.g., line of sight, etc.). The flight plan 324 may be initially created using travel related data, such as a travel related data provided by the data aggregator 322 and other sources. The flight plan 324 may include altitude information, and thus be three-dimensional. For example, a flight plan may be created to cause a UAV to fly over or under certain areas or entities (e.g., an obstacle, a ground area with magnetic interference, a crowd of people, a weather system, etc.), as well as around such areas or entities depending on the flight capabilities of the UAV and other operating constraints.

During flight, the UAV 400 (and the other UAVs 400(1)-400(N)) may collect travel related data 326, which may be sensed by sensors onboard the UAV(s). The travel related data 326 may also include data from other devices, as discussed above, such as the data aggregator 322, the local data collection stations 318, the ground vehicles 320, etc. possibly via communications from the central management system 226 and/or direct communications from the sources of the travel related data. For example, the local data collection stations 318 may broadcast travel related data that can be received by the UAV 400 during flight. In various implementations, the travel related data may include any data related to the travel of UAVs (e.g., as may be utilized for the planning of flights for UAVs, etc.). For example, some travel related data may indicate obstacles (e.g., new or modified buildings, construction cranes, trees, etc.), phenomenon (e.g., magnetic interference), signal strength (e.g., GPS quality signal areas), etc. Some travel related data may be about the weather, such as winds 328, precipitation 330, fog or visibility, temperature, and/or other weather in the environment, as sensed by the various devices described above.

In various implementations, travel related data regarding obstacles may include GPS or other coordinates regarding the location of the obstacle, an identification of the obstacle (e.g., a particular building, bridge, construction crane, etc.), physical characteristics of the obstacle (e.g., height, width, etc.) and other relevant data regarding the obstacle. Depending on the size of the obstacle, different GPS coordinates may be utilized to indicate the perimeter and/or area of the obstacle (e.g., including the corners of a building, etc.). As another example, travel related data regarding the weather may include GPS or other coordinates regarding the location of the weather, a direction of movement, a size of area covered, wind speed, amount of precipitation, etc. As another example, travel related data regarding a crowd of people may include GPS or other coordinates regarding a location, characteristics regarding the size of the crowd and/or area covered, indications if the crowd is increasing and/or decreasing, a direction of movement of the crowd (e.g., people running in a marathon race, a demonstration moving from location-to-location, etc.). As another example, travel related data regarding magnetic interference may include GPS or other coordinates regarding a location and/or area of the occurrence, the strength of the magnetic interference from a given source point, etc.

The UAV 400 and/or the central management system 226 may use the travel related data 326 to update the flight plan 324 and/or create a new flight plan for the UAV 400, which can replace/overwrite the flight plan 324. For example, the UAV 400 may include a flight plan that causes the UAV 400 to travel to a first waypoint "A" (i.e., waypoint 332). At or prior to arriving at the waypoint 332, the travel related data 326 may be used to update the flight plan (or create a new flight plan) to determine how best to travel to the next waypoint or the destination 240 based on the travel related data 326. For example, the flight plan 324 may, before an update, direct the UAV 400 along a travel route 334. However, based on the travel related data 326, the UAV 400 may instead be directed along a travel route 336. In some implementations, the UAV 400 may be directed along the travel route 336 by a flight controller without necessarily updating a flight plan or all of the waypoints of the flight plan.

The travel route 336 may be selected instead of the travel route 334 based on various factors. For example, travel related data that indicates a new obstacle 350 (e.g., a new construction crane) and/or a new or increased source of magnetic interference 352 (e.g., due to ore deposits, etc.) along the travel route 334 may make the travel route 336 preferable. As another example, the travel related data may indicate directions of winds at particular locations, which may include a headwind 328(2) along the travel route 334 and a tailwind 328(3) along the travel route 336, which may make the travel route 336 preferable. In some implementations, travel routes may be selected based on known geographic features in an area, such as wind shadows caused by cliffs or tree lines (e.g., trees 354), convergence zones, downdrafts, and/or other known features and/or frequently occurring phenomenon. Some phenomenon may be correlated with geographic features to enable identification of other possible occurrences of the phenomenon, and the geographic features, respective locations, various measurements and other data regarding the phenomenon may be recorded as part of the travel related data.

As an example scenario, a data aggregator may have provided travel related data (e.g., indicating obstacles such as trees 354, weather such as wind 328(1) and/or a corresponding weather forecast, a local GPS signal strength, a magnetic interference, a construction activity, a crowd of people, etc.) on the basis of which the travel route 334 may have been originally planned and/or determined. In addition, an estimated travel time for the UAV 400 to deliver the item 308 to the delivery location 240 may have been originally determined based on the planned first travel route 334. After the first travel route 334 was planned, other UAVs flying through the area (e.g., UAV 400(1), UAV 400(N), etc.) may have more recently provided additional travel related data (e.g., indicating information that was not indicated by the original travel related data, such as regarding the obstacle 350, the magnetic interference 352, the winds 328(2) and 328(3), etc.). On the basis of the updated travel related data (e.g., indicating the obstacle 350, the magnetic interference 352, and/or the winds 328(2) and 328(3), etc.) as combined with the original travel related data (e.g., indicating the trees 354 and/or the wind 328(1), etc.), the second travel route 336 may have been planned and/or determined for the UAV 400. Correspondingly, an updated estimated travel time may have also been determined for the UAV 400 to deliver the item 308 to the delivery location 240, based on the travel route 336. In some instances, a user (e.g., at the delivery location 240) may be sent a notification regarding an updated estimated delivery time that is calculated based on the updated estimated travel time.

As another example scenario, the travel route 334 may have been planned for the UAV 400 by the central management system 226 based at least in part on travel related data (e.g., indicating the trees 354, the wind 328(1), etc.) that was stored in a memory of the central management system 226. During or alter the flight of the UAV 4(00, a determination may have been made that the UAV 400 deviated from the planned travel route 334 to avoid a location in the area. For example, the UAV may have deviated from the planned travel route 334 to avoid a location that corresponds to the obstacle 350, the source of the magnetic interference 352, the wind 328(2), etc. In various implementations, while the flight paths and/or timing of the UAV 400 may be recorded and/or monitored, the UAV 400 may not always record or report all data regarding why a particular deviation occurred. In the present example, the obstacle 350, the magnetic deviation 352, and the wind 328(2), may each be sensed by sensors of the UAV 400, on the basis of which the UAV 400 may have deviated from the planned travel route 334, without recording specific data regarding the obstacle 350, the magnetic interference 352 or the wind 328(2).

In such an instance, in order to further investigate the first location where the UAV 400 deviated from the planned travel route 334, an additional UAV (e.g., which may have additional sensors and/or recording capabilities) may be sent to collect travel related data regarding the first location. In such an instance, the additional collected travel related data may indicate the reason why the location was avoided by the UAV 400 (e.g., indicating that there is an obstacle 350, a source of magnetic interference 352, a wind 328(2), etc.) at the first location. This collected travel related data may be recorded as part of an update to the travel related data (e.g., as stored in the memory of the central management system 226 and/or the UAV 400). It will be appreciated that the obstacle 350, the source of the magnetic interference 352, or the wind 328(2) may not have been present at the first location at the time when the first travel route 334 was planned. For example, the obstacle 350 may correspond to a new structure that has been constructed or equipment that has recently been moved into the area. As another example, the wind 328(2) may correspond to a microburst that tends to occur along the line of trees 354 when strong winds are occurring in the area. In such an instance, the first location where the microburst 328(2) tends to occur may be stored as a location to avoid when a determination is made that strong winds are occurring in the area.

As part of the delivery of the item 308 to the location 240, or independent of that delivery, a flight plan for the UAV 400 may also or alternatively include travel from the location 240 to the materials handling facility 230. For example, the UAV 400 may also or alternatively perform an item return process, wherein the UAV 400 may acquire an item at the location 240 which a user is returning and which the UAV 400 is to deliver to the materials handling facility 230 (e.g., which may be designated as a delivery location for the returned item). As part of a flight plan, at or prior to a waypoint "B" (i.e., waypoint 338), a determination may be made if the UAV 400 should follow a travel route 340 or a travel route 342. Similar to the examples described above, in various implementations a travel route for the UAV 400 may be planned and/or determined based at least in part on travel related data that is received from multiple sources.

For example, one or more other UAVs 400(1)-400(N) may have previously attempted to travel along the travel route 342, but may have utilized sensors to detect and record travel related data regarding an obstacle 350 and/or magnetic interference 352. The travel related data may have been transmitted or otherwise provided to the central management system 226 and/or directly to the UAV 400. This travel related data (e.g., which indicates the location and/or characteristics of the obstacle 350 and/or the magnetic interference 352) may be utilized by the central management system 226 and/or the UAV 400 to plan and/or determine a travel route for the UAV 400. For example, based on the travel related data provided by the one or more other UAVs, in combination with travel related data that may be provided from other sources (e.g., a data aggregator which provides travel related data regarding the wind 328(4), the precipitation 330, etc.), the travel route 340 may be determined and/or selected over the travel route 342 for traveling back to the materials handling facility 230. As noted above, if the travel route 342 had previously been planned and/or determined for the UAV 400, the switch to the travel route 340 may have been based on updated travel related data (e.g., regarding the obstacle 350, the source of the magnetic interference 352, the precipitation 330, etc.) that may have been received from other UAVs and/or other sources.

In some instances, UAV 400 may be directed to land and discontinue flight, at least temporarily, based on the travel related data 326. In such instances, a landing location 344 may be selected based on various considerations. Some landing locations may be predetermined as optimal landing locations for various reasons, such as presence of shelter, presence of battery charging equipment, and/or for other reasons. When no predetermined landing location is within a threshold distance from the UAV that is attempting to land, the UAV may survey the nearby landscape to determine an acceptable landing location, such as using image analysis and/or other autonomous techniques that may or may not include communications with the central management system 226.

In accordance with one or more implementations, the UAV 400 may include a flight plan that coordinates with one of the vehicles 320 that is used to transport the UAV 400 and/or the item 308 in a desired direction (e.g., for energy efficiency, safety, etc.). For example, for energy efficiency, a vehicle 320 may be utilized to transport the UAV into a headwind rather than causing the UAV to fly into the headwind. As another example, for safety, a vehicle 320 may be utilized to transport the UAV through an area where it may otherwise be dangerous for a UAV to fly (e.g., in strong winds, over a crowd of people, etc.). In one implementation, at or prior to reaching the waypoint 332, the UAV may coordinate with a vehicle and have the vehicle transport the UAV and/or the item 308 along a ground route (e.g., a road, etc.) in a similar direction as the route 334 (e.g., which may be subject to a strong headwind 328(2) as shown in FIG. 3, or may be over a crowd of people that has formed, etc.). The vehicle 320 may shuttle the UAV 400 to a location (e.g., which may be upwind), which may allow the UAV to primarily conduct flight with a tailwind, or which may be away from a crowd of people, etc.). In some implementations, land vehicles may be stationed at different locations in the environment 300 to transport UAVs and/or items accordingly. In various implementations, the UAV 400 may selectively coordinate with the land vehicles for this purpose, such as when the travel related data 326 indicates that use of a land vehicle is prudent. For example, when the travel related data 326 indicates a presence of high gusty winds, or a crowd of people, the UAV may land and coordinate with a land vehicle to accomplish a next segment of the travel route and/or complete the delivery of the item 308 to the destination 240.

In various implementations, the methods and techniques described above with respect to FIG. 3 may be utilized for various types of applications. For example, if a product manager (e.g., who is associated with the materials handling facility 230 or other entity, etc.) desires to expand into a new marketplace within the environment 300, the central management system 226 may be queried with regard to a proposed area of operations. In response to the query, stored travel related data and associated analysis may be accessed for providing various types of information (e.g., what travel related data will affect delivery operations in the proposed area, how many deliveries are able to made in the proposed area based on the different periodic variances in the travel related data, how many operating hours/days in the proposed area are typically available depending on the variances in the travel related data, etc.).

The various implementations, different types of forecasts may be made regarding the travel related data (e.g., forecasts regarding weather, obstacles being added or removed, crowds forming or disbursing, GPS signal strength increasing or decreasing, etc.) Such forecasts may be utilized for determining various factors (e.g., how many UAVs are needed at the materials handling facility 230, how quickly items can be delivered from the materials handling facility 230, etc.). As one example, if a forecast indicates that heavy rain is coming, it may be predicted that there is going to be a demand for umbrellas. If the forecast also indicates that there will be a break in the heavy rain, it may be desirable to be able to deliver the umbrellas when the break occurs. In such an instance, within the materials handling facility 230 (e.g., including the processes described above with respect to FIG. 1), the umbrellas may be moved to the transporting area 155 in preparation for transport by UAVs when the break in the rain occurs. In addition, while the heavy rain is occurring (e.g., which may inhibit the flying of the UAVs), the UAVs may be prepared for the deliveries (e.g., charged, loaded with items, etc.), so that the UAVs will be ready to deliver the umbrellas or other items when the break in the rain occurs.

With respect to such forecasts, it will be appreciated that predictions may be made for various time periods in the future. For example, with regard to an upcoming delivery, the travel related data may be utilized to forecast what conditions may be like 30 minutes into the future. In contrast, with respect to long range planning, the travel related data may be utilized to forecast what the general conditions are expected to be like days, months, years into the future in the environment 300 or in other environments, with regard to the planning and optimization of various operations for the materials handling facility 230.

In various implementations, the overall functions of the materials handling facility 230 may be impacted by updates to the travel related data in specific ways. For example, if the materials handling facility 230 is expected to be able to deliver a certain number of items on a given day (e.g., 15,000 items), the expected number of items to be delivered may be impacted by updates to the travel related data (e.g., as received from UAVs flying in the field and/or other sources). For example, a new obstacle (e.g., building, construction equipment, etc.) may have been erected or placed at a location that blocks or inhibits a previously utilized travel route, for which the central management system 226 may determine a more efficient and optimized travel route that avoids the new obstacle, which may impact the associated travel times and correspondingly the overall number of deliveries that can be made in the given day. As another example, if a crowd has formed (e.g., due to a concert, demonstration, etc.) beneath a commonly utilized travel route, the central management system 226 may reroute the UAVs to not fly over the crowd (e.g., for safety reasons), which may impact the associated travel times and correspondingly the number of deliveries that can be made in the given day.

With further regard to the forecasts that are based on the travel related data, if particular UAVs have better capabilities for certain conditions, circumstances, etc., such UAVs may be moved to an area where such conditions, circumstances, etc. are expected to occur, or are occurring. For example, a UAV that is better able to navigate around obstacles may be moved to an area where more obstacles are expected to be encountered. As another example, a UAV that is safer to fly over or around crowds of people, may be moved to an area where more crowds of people are expected to occur. As another example, a UAV that has better capabilities for operating in certain weather conditions (e.g., strong winds, snow, etc.) may be sent to an area where such weather conditions are expect to occur (or are already occurring).

Figure 4:
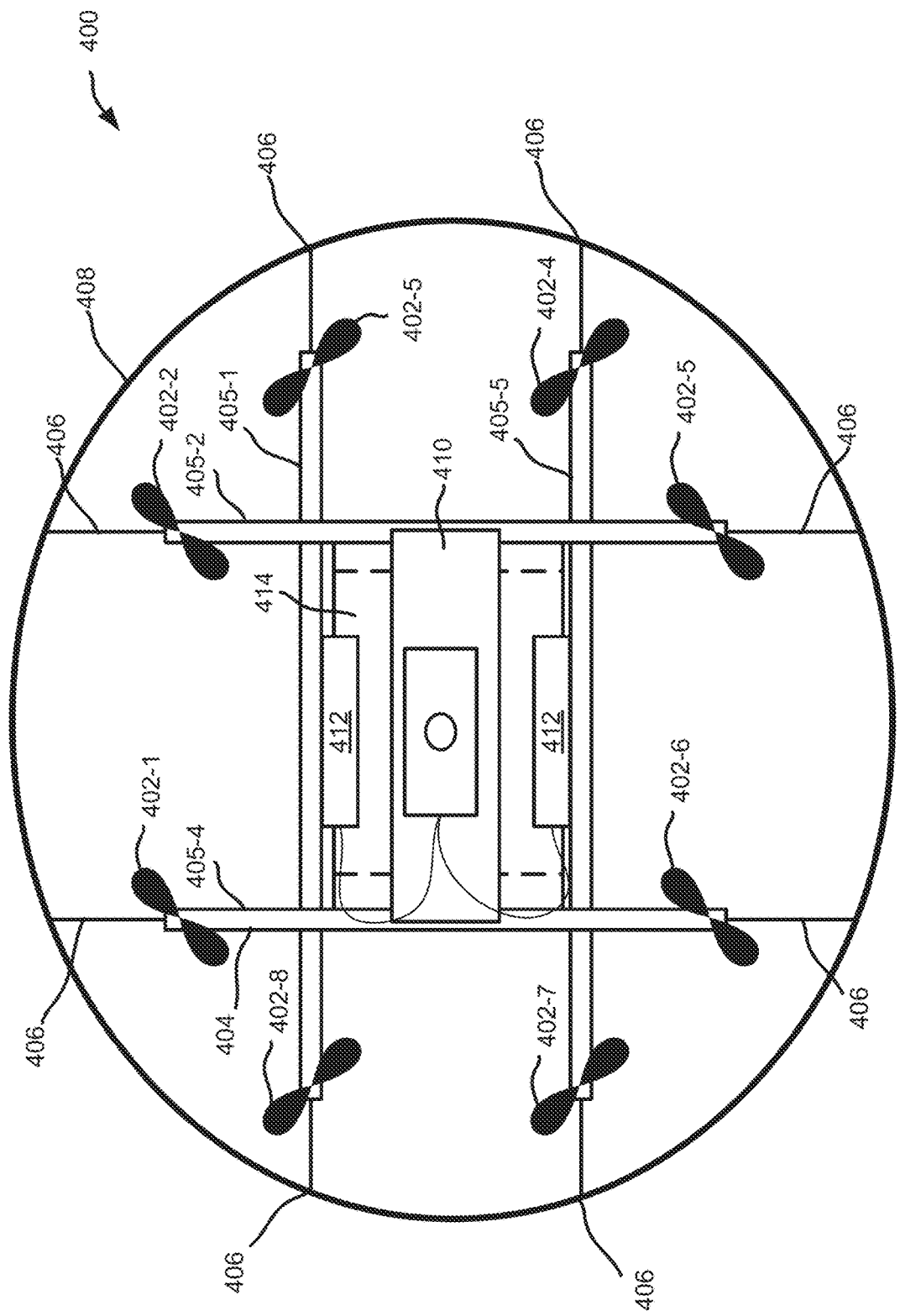
FIG. 4 depicts a block diagram of a top-down view of an unmanned aerial vehicle, according to an implementation.

FIG. 4 illustrates a block diagram of a top-down view of a UAV 400, according to an implementation. As illustrated, the UAV 400 includes eight propellers 402-1, 402-2, 402-3, 402-4, 402-5, 402-6, 402-7, 402-8 spaced about the frame 404 of the UAV as part of a propulsion system for the UAV 400. The propellers 402 may be any form of propeller (e.g., graphite, carbon fiber) and of a size sufficient to lift the UAV 400 and any item engaged by the UAV 400 so that the UAV 400 can navigate through the air, for example, to deliver an item to or from a user specified location. While this example includes eight propellers, in other implementations, more or fewer propellers may be utilized. Likewise, in some implementations, the propellers may be positioned at different locations on the UAV 400. In addition, alternative methods of propulsion may be utilized. For example, fans, jets, turbojets, turbo fans, jet engines, and the like may be used to propel the UAV.

The frame 404 or body of the UAV 400 may likewise be of any suitable material, such as graphite, carbon fiber, and/or aluminum. In this example, the frame 404 of the UAV 4(00 includes four rigid members 405-1, 405-2, 405-3, 405-4, or beams arranged in a hash pattern with the rigid members intersecting and joined at approximately perpendicular angles. In this example, rigid members 405-1 and 405-3 are arranged parallel to one another and are approximately the same length. Rigid members 405-2 and 405-4 are arranged parallel to one another, yet perpendicular to rigid members 405-1 and 405-3. Rigid members 405-2 and 405-4 are approximately the same length. In some implementations, all of the rigid members 405 may be of approximately the same length, while in other implementations, some or all of the rigid members may be of different lengths. Likewise, the spacing between the two sets of rigid members may be approximately the same or different.

While the implementation illustrated in FIG. 4 includes four rigid members 405 that are joined to form the frame 404, in other implementations, there may be fewer or more components to the frame 404. For example, rather than four rigid members, in other implementations, the frame 404 of the UAV 400 may be configured to include six rigid members. In such an example, two of the rigid members 405-2, 405-4 may be positioned parallel to one another. Rigid members 405-1, 405-3 and two additional rigid members on either side of rigid members 405-1, 405-3 may all be positioned parallel to one another and perpendicular to rigid members 405-2, 405-4. With additional rigid members, additional cavities with rigid members on all four sides may be formed by the frame 404. As discussed further below, a cavity within the frame 404 may be configured to include an item engagement mechanism for the engagement, transport, and delivery of item(s) and/or containers that contain item(s).

In some implementations, the UAV may be configured for aerodynamics. For example, an aerodynamic housing may be included on the UAV that encloses the UAV control system 410, one or more of the rigid members 405, the frame 404, and/or other components of the UAV 400. The housing may be made of any suitable material(s) such as graphite, carbon fiber, aluminum, etc. Likewise, in some implementations, the location and/or the shape of the item engagement mechanism and/or any items or containers may be aerodynamically designed. As will be described in more detail below, in some instances a container may be utilized for holding an item, wherein the item engagement mechanism engages the item by engaging the container. For example, specially shaped containers for use with the UAV 400 may be aerodynamically designed and provided in a materials handling facility 230, such that an agent or automated system is able to select one of the containers and place the item in the container for engagement by the UAV 400. In some implementations, the item engagement mechanism may be configured such that when an item and/or container is engaged it is enclosed within the frame and/or housing of the UAV 400 so that no additional drag is created during transport of the item. In other implementations, the item and/or container may be shaped to reduce drag and provide a more aerodynamic design. For example, if a portion of a container extends below the UAV when engaged, the exposed portion of the container may have a curved shape.

The propellers 402 and corresponding propeller motors are positioned at both ends of each rigid member 405. The propeller motors may be any form of motor capable of generating enough speed with the propellers to lift the UAV 400 and any engaged item thereby enabling aerial transport of the item. Extending outward from each rigid member is a support arm 406 that is connected to a safety barrier 408. In this example, the safety barrier is positioned around and attached to the UAV 400 in such a manner that the motors and propellers 402 are within the perimeter of the safety barrier 408. The safety barrier may be plastic, rubber, etc. Likewise, depending on the length of the support arms 406 and/or the length, number or positioning of the rigid members 405, the safety barrier may be round, oval, or any other shape.

Mounted to the frame 404 is the UAV control system 410. In this example, the UAV control system 410 is mounted in the middle and on top of the frame 404. The UAV control system 410, as discussed in further detail below with respect to FIG. 13, controls the operation, routing, navigation, communication, object sense and avoid, and the item engagement mechanism of the UAV 400.

The UAV 400 also includes one or more power modules 412. In this example, the UAV 400 includes two power modules 412 that are removably mounted to the frame 404. The power module for the UAV may be in the form of battery power, solar power, gas power, super capacitor, fuel cell, alternative power generation source, or a combination thereof. For example, the power modules 412 may each be a 6000 mAh lithium-ion polymer battery, polymer lithium ion (Li-poly, Li-Pol, LiPo, LIP, PLI, or Lip) battery. The power module(s) 412 are coupled to and provide power for the UAV control system 410 and the propeller motors of the propulsion system.

The power modules 412 store energy with corresponding energy levels. In various implementations, the stored energy of the power modules 412 may be conserved through various techniques. For example, for part of a travel route the UAV 4(X) may be flown to travel along with a direction of an airflow/wind on a way to a destination. In some instances, when a portion of a travel route is in a direction that is against a direction of an airflow/wind, rather than flying, the UAV may instead be transported by a transportation vehicle. In various implementations, a transportation vehicle may be a land vehicle (e.g., automobile, truck, autonomous vehicle, mobile drive unit, other automated mobile vehicle, other mobile machine, etc.), for which the control may be manual (e.g., a driver) or automated (e.g., directly or remotely controlled by an automated system, robotic, etc.).

The energy levels of the power modules 412 may be monitored by the UAV control system 410. In one implementation, if the energy levels are determined to be below a critical threshold during a flight of the UAV, an emergency maneuver (e.g., an emergency landing) may be required. In some implementations, one or more of the power modules may be configured such that it can be autonomously removed and/or replaced with another power module while the UAV is landed. In some implementations, when the UAV lands at a designated location (e.g., at a materials handling facility, a delivery location, etc.), the UAV may engage with a charging member at the location that will recharge the power module.

As mentioned above, the UAV 400 may also include an item engagement mechanism 414. The item engagement mechanism may be configured to engage and disengage items and/or containers that hold items. In this example, the item engagement mechanism 414 is positioned within a cavity of the frame 404 that is formed by the intersections of the rigid members 405. The item engagement mechanism may be positioned beneath the UAV control system 410. In implementations with additional rigid members, the UAV may include additional item engagement mechanisms and/or the item engagement mechanism 414 may be positioned in a different cavity within the frame 404. The item engagement mechanism may be of any size sufficient to securely engage and disengage items and/or containers that contain items. In other implementations, the engagement mechanism may operate as the container, containing the item(s) to be delivered. The item engagement mechanism communicates with (via wired or wireless communication) and is controlled by the UAV control system 410.

While the implementations of the UAV discussed herein utilize propellers to achieve and maintain flight, in other implementations, the UAV may be configured in other manners. In one implementation, the UAV may include fixed wings and/or a combination of both propellers and fixed wings. For example, the UAV may utilize one or more propellers to enable takeoff and landing and a fixed wing configuration or a combination wing and propeller configuration to sustain flight while the UAV is airborne.

As will be described in more detail below with respect to FIG. 13, the UAV control system 410 may operate in conjunction with or may otherwise utilize or communicate (e.g., via wired and/or wireless communication) with one or more components of the UAV management system 226. Likewise, components of the UAV management system 226 may generally interact and communicate with the UAV control system 410.

Figure 5:
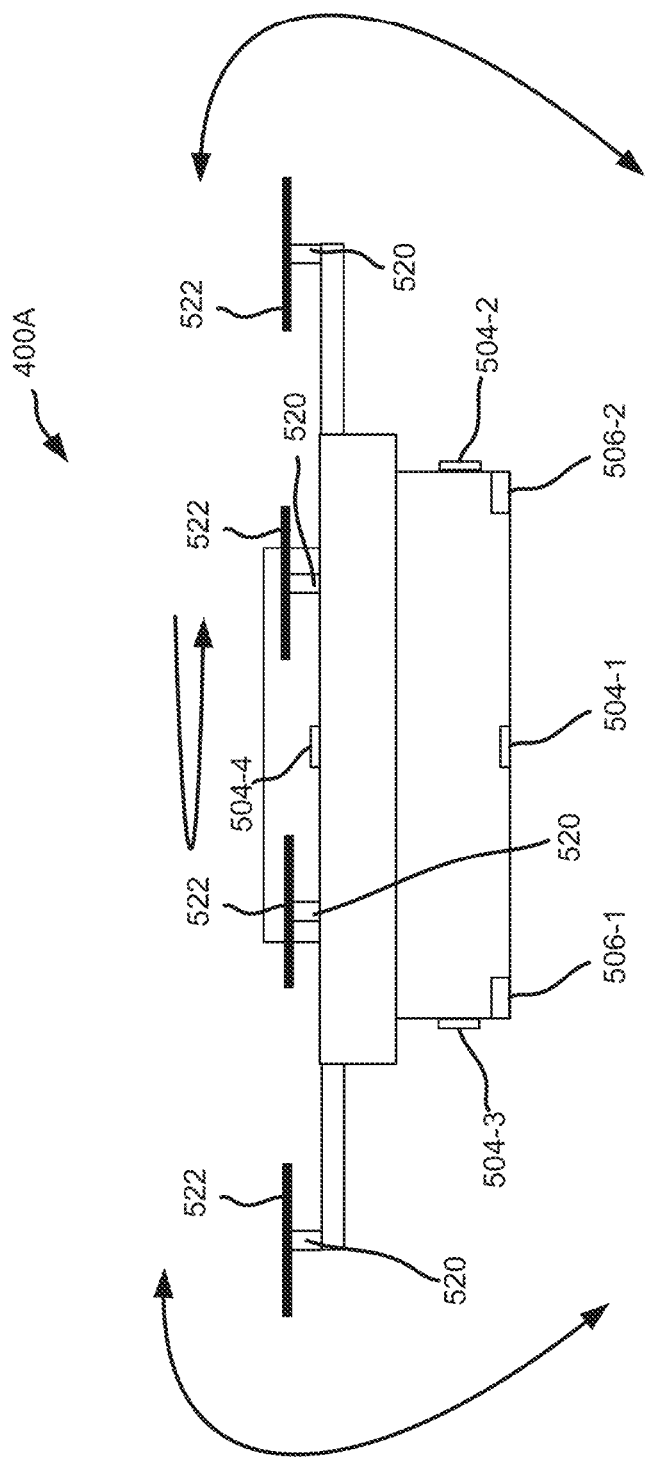
FIG. 5 depicts a block diagram of a side view of an unmanned aerial vehicle, according to an implementation.

FIG. 5 depicts a block diagram of a side view 500 of an UAV 400A, according to an implementation. In the side view of the UAV illustrated in FIG. 5, four motors 520 and propellers 522 are visible as part of the propulsion system of the UAV. In other implementations, additional or fewer motors 520 and/or propellers may be included in the UAV 400A. In this example, the motors 520 may all be mounted at 90 degrees with respect to the UAV 400A. In an alternative implementation the mountings of the motors may be adjustable (e.g., for increased maneuverability, etc.).

Certain flight and landing maneuvers may be accomplished in some instances by manipulating the pitch, yaw and/or roll of the UAV. It will be appreciated that with UAVs, such as a quad-copter or an octo-copter, the general direction of travel of the UAV may be maintained even though the pitch, yaw, and roll are altered. For example, a UAV may be moving north and the yaw may be adjusted so that the UAV 400A rotates in a clockwise direction (e.g., to position a particular sensor 504 in a direction for sensing, travel related data, as will be described in more detail below). The rotation can occur without altering the direction of flight. Likewise, the pitch and/or roll can be adjusted without altering the flight path of the UAV 400A.

As shown in FIG. 5, various sensors 504 may be mounted to the UAV 400A. For example, a sensor 504-1 may be mounted near the bottom of the UAV 400A. Similarly, sensors 504-2, 504-3 and 504-4 may be mounted to the front, back and top of the UAV 400A, respectively. The sensors 504 may be of various general types (e.g., obstacle sensors, weather sensors, etc.) For example, one or more of the sensors 504 may include an imaging sensor that may be utilized to image or scan various elements in the environment around the UAV. As another example, one or more of the sensors 504 may include a distance detection sensor for measuring and monitoring the distance between the UAV 400A and other objects, structures, the ground, etc. It will be appreciated that certain types of sensors may in some instances be utilized as obstacle sensors, weather sensors, etc., and which may each be utilized to sense travel related data that is recorded. For example, image sensors, distance detection sensors, etc., may be utilized to detect an obstacle, for which travel related data including the location and characteristics (e.g., one or more physical dimensions) of the obstacle may be recorded. As another example, one or more of the sensors that may be utilized as weather sensor may include airflow sensors, for determining winds relative to the UAV, for which the wind speeds, direction, location, etc. may be recorded as travel related data. While the particular example illustrated in FIG. 5 includes four sensors 504 mounted to the UAV 400, in other implementations, fewer or additional sensors may be utilized.

Various securing components 506 may also be provided that may be utilized for securing the UAV 400A to a landing location, transportation vehicle, etc. For example, securing components 506-1 and 506-2 (e.g., including electromagnets, hooking mechanisms, etc.) are provided on the bottom of the UAV 400A. The securing components 506-1 and 506-2 may be utilized during or after a landing procedure and may couple to corresponding securing components at a landing location, on a transportation vehicle, etc. In various implementations, if travel related data indicates that strong relative airflows will occur, or are occurring, it may be desirable to anchor the UAV for safety. For example, if a UAV is to perform an emergency landing due to a storm, it may be desirable to anchor the UAV to the landing location so that strong storm winds do not move the UAV while landed. As another example, if a UAV is to land on a roof of a transportation vehicle (e.g., to be transported upwind for energy efficiency or safety), it may be desirable to securely anchor the UAV to the roof of the transportation vehicle so that the UAV does not blow off as the transportation vehicle is moving (e.g., traveling along a highway, etc.).

In various implementations, different types of corresponding securing components may be provided at landing locations, on transportation vehicles, etc. For example, if a landing location or transportation vehicle includes a metal surface, the metal surface may function as a passive securing component to which one or both of the securing components 506-1 and 506-2 (e.g., electromagnets) may attach. As another example, a securing component (e.g., a hooking mechanism) may be at a landing location, on a transportation vehicle, etc., and may couple to one or both of the securing components 506-1 and 506-2 (e.g., corresponding hooks, bars, etc.). In various implementations, one or both of the securing components 506-1 and 506-2 may also or alternatively be charging components (e.g., inductive charging elements, plugs, sockets, ports, etc.) that may couple to corresponding charging components at the landing location, on a transportation vehicle, etc.) and provide energy to recharge the power modules of the UAV 400A.

Figure 6:
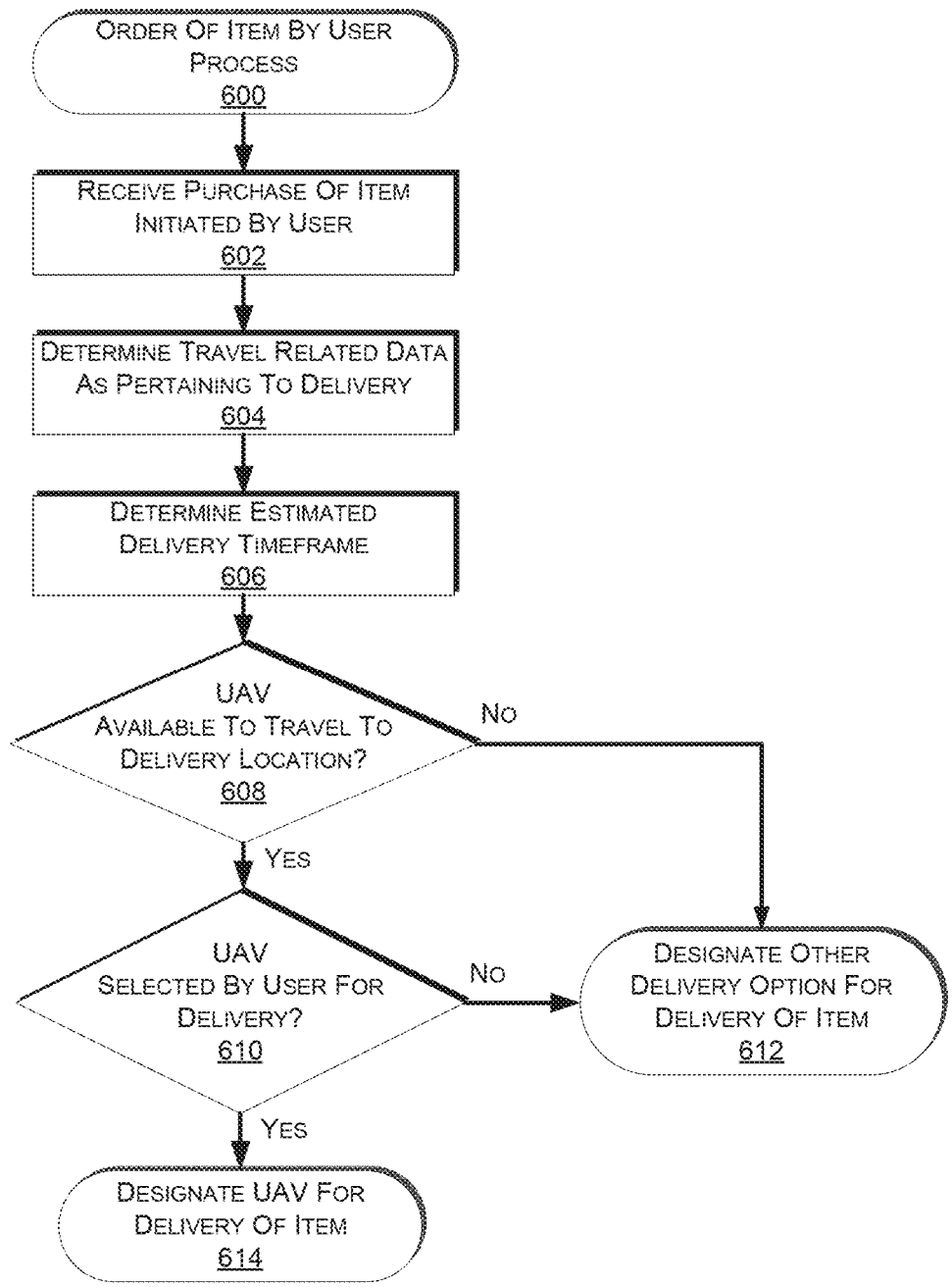
FIG. 6 is a flow diagram illustrating an example process for processing a user order for an item, according to some implementations.

FIG. 6 is a flow diagram illustrating an example process 600 for processing a user order for an item. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 begins with the receipt of a purchase request initiated by a user, as in 602. In various implementations, as part of the purchase request for an item, the data that is received may include attributes of the order, customer information (delivery location, etc.), and/or other information that may be used to determine delivery parameters. Upon receiving the purchase request for the item from the user, a determination is made of travel related data as pertaining to the delivery, as in 604. In various implementations, for options that include use of a UAV, travel related data that pertains to possible travel routes along which a UAV may fly for delivering the item may be determined. For example, travel related data that indicates terrain, obstacles, weather forecasts, etc. along the possible travel routes may be determined.

After the travel related data is determined, a determination is made of the estimated delivery timeframe for the ordered item, as in 606. In some examples, this may include identifying a materials handling facility with the requested item in stock and estimating the time required to fulfill the item to the user. In other implementations, the estimated delivery timeframe may be a set day from the date of the purchase request or a series of days. For example, a user may specify that the delivery timeframe is to be one day from the date of the purchase request or between three and five days from the date of the purchase request. In still other implementations, the estimated delivery timeframe may be a set day of the week upon which the user has requested to have items delivered. For example, a user may preselect to have items ordered during the week delivered on Thursday of every week.

For delivery options that include use of a UAV, the delivery estimates (or delivery time windows) and corresponding estimated travel times for the order may be determined at least in part based on the travel related data and other parameters associated with the order. For example, if the order includes heavy items, the estimates may reflect the availability of larger UAVs to perform the delivery, and so forth. In various implementations, the travel related data may include information that results in minor changes in the delivery estimates. For example, a UAV may be required to fly slower than usual in certain areas for safety reasons (e.g., through an area where newly constructed obstacles have been discovered, where people may be present, etc.) As another example, travel related data that indicates a forecast for a headwind may cause additional time to be added to the delivery estimate. In some instances, the travel related data may cause use of a travel route that is different than an originally planned travel route, which may cause an increase in an estimated amount of time for a delivery. For example, travel related data that indicates a newly discovered obstacle (e.g., a construction crane) may require more travel time for the UAV to fly around the obstacle. In various instances, the travel related data may indicate that certain types of deliveries at certain times may be unavailable. For example, for safety reasons it may be undesirable to have a UAV travel in an area where there is expected to be poor GPS signal strength, or above an area where there will be large crowds of people (e.g., such as for a demonstration, concert, etc.). As another example, it may be undesirable to have a UAV fly during certain inclement weather conditions (e.g., a heavy storm, freezing rain or hail, etc.).

After the estimated delivery timeframe is determined, a determination is made if a UAV is available to travel to make the delivery to the user specified delivery location, as in 608. If it is determined that a UAV is available to travel to make the delivery, a determination is made if a UAV is selected by the user for the delivery, as in 610. In various implementations, an interaction may be received from a user through a user interface that presents delivery options to the user and receives a selection from the user (e.g., for selecting delivery by a UAV or other delivery option). In addition, in various implementations a user may preselect or provide a preference for deliveries by UAVs or other delivery options. If a UAV is not selected by the user for the delivery, as in 610, or if no UAV is available, as in 608, another delivery option is designated for the delivery of the item, as in 612. For example, other delivery options may include shipments by traditional carriers. If a UAV is selected by the user for the delivery, the item is designated for delivery by a UAV, as in 614.

Figure 7:
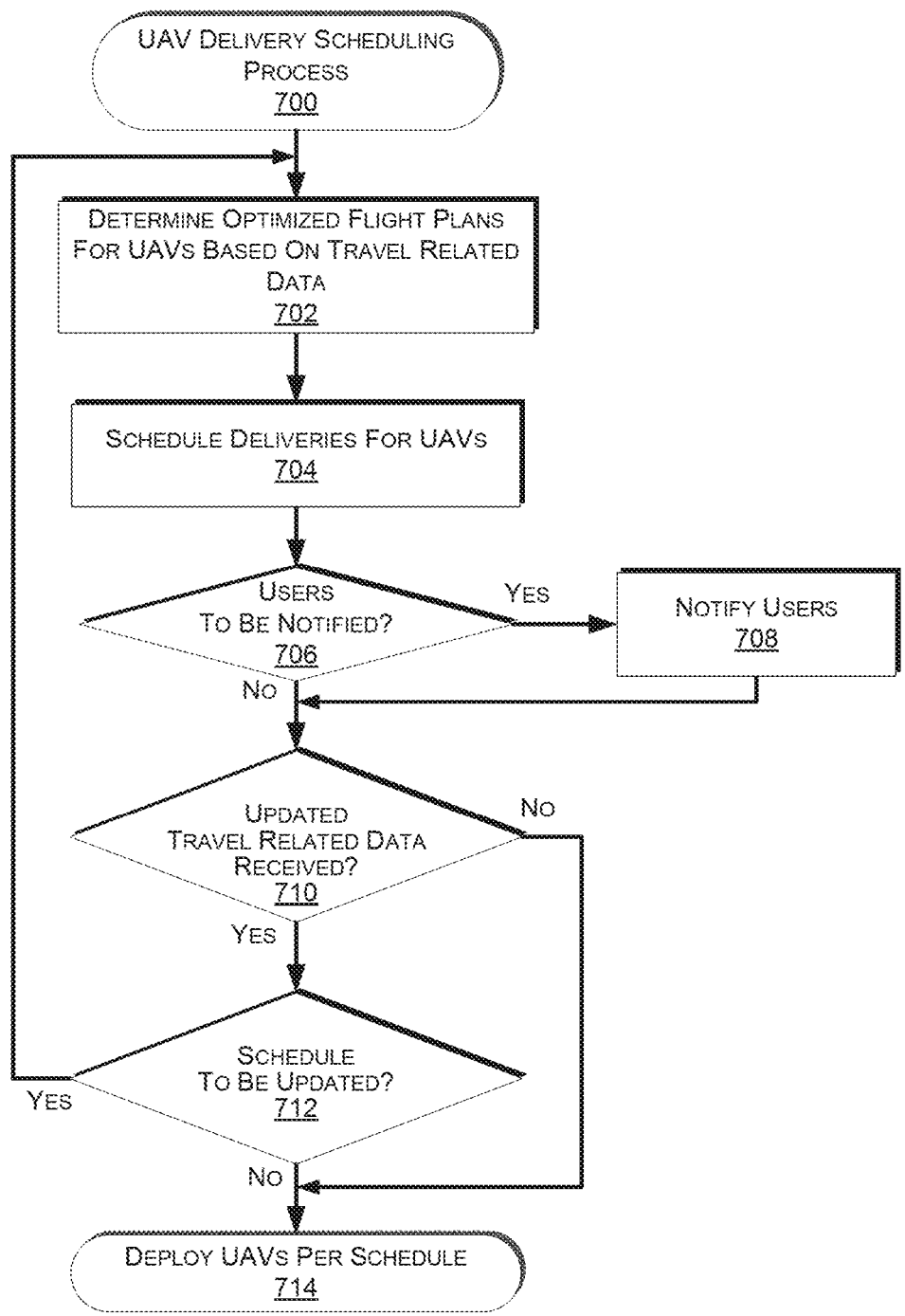
FIG. 7 is a flow diagram illustrating an example process for scheduling unmanned aerial vehicle deliveries, according to some implementations.

FIG. 7 is a flow diagram illustrating an example process 700 for scheduling UAV deliveries, according to some implementations. The example process begins with determining optimized flight plans for UAVs based on travel related data, as in 702. A determined flight plan may include a selection of waypoints and/or other routes and/or objectives based on the current travel related data. For example, the travel related data may indicate obstacles, areas with magnetic interference, areas with poor GPS signal strength, outdoor areas with people, etc., all of which may be considered when determining an optimal flight plan for a UAV. As other examples, the travel related data may indicate weather forecasts, for which the flight plan may include a travel route for the UAV that has limited or no exposure to a headwind, precipitation, and/or other weather or conditions that may inhibit the flight of the UAV. In various implementations, the flight plan may cause the UAV to travel along a travel route or in a direction that is energy efficient. For example, a flight plan may include flying a UAV in a downwind direction (along with the wind), and using a transportation vehicle for transporting the UAV to an upwind location, as further discussed below.

In various implementations, a determination of the optimized flight plans may also include considerations of flight restrictions that are to be placed on UAVs. For example, if travel related data indicates that an area currently has poor GPS signal strength, or crowds of people, or other conditions that may inhibit a flight of a UAV or may be considered potentially unsafe for travel, UAVs may be restricted from travelling through such areas. As another example, if travel related data includes a forecast for very high winds (e.g., in excess of 50 mph, etc.), heavy precipitation, and/or other inclement weather, a determination may be made that no UAVs or only some UAVs may be deployed into affected regions at the forecasted times of the inclement weather. A risk analysis of UAV travel under certain types of conditions may be performed. The risk analysis may be used to determine a cost of the delivery, a variance or window of time for a delivery, and/or whether the delivery is available for selection. As an example, when a risk is low (e.g., favorable flight conditions or circumstances), and the fleet of UAVs is relatively underutilized, a central management system may provide an indication to offer UAV deliveries at a discount, possibly to select users.

Once optimized flight plans are determined, deliveries are scheduled for the UAVs, as in 704. In various implementations, items may be scheduled to be delivered by specific UAVs from specific materials handling facilities based on the previously determined optimized flight plans. In various implementations, a specific materials handling facility of a group of materials handling facilities may be selected for fulfilling certain items based on the specific materials handling facility having certain favorable geographic or other characteristics as indicated by the travel related data. For example, a materials handling facility for which a direct travel route to a delivery location may generally go over a crowd of people (e.g., due to a concert or demonstration) or through a construction area with new and/or unknown construction cranes and/or structures, may be less desirable for selection than a materials handling facility with a direct clear flight path to the delivery location. As another example, a materials handling facility that is upwind from a destination of the delivery may enable a UAV to travel downwind toward the destination and preserve battery life. As another example, some deliveries may be scheduled during specific times (e.g., early morning when there may be fewer people, calmer weather, etc.). Certain types of conditions (e.g., calm weather) may also allow smaller and more energy efficient UAVs to be utilized for deliveries. The scheduling of the deliveries may also be based at least in part on the availability of certain sizes of UAVs (e.g., larger UAVs being required for transporting heavier items and or in certain conditions, such as heavy winds, etc.).

As the deliveries are scheduled, a determination is made if notifications are to be sent to users, as in 706. For example, a user may receive a notification regarding an expected delivery date and/or time of an item. If the users are to be notified, notifications are sent to the users, as in 708. Once the notifications have been sent to the users, or if the users are not to be notified, a determination is made if updated travel related data has been received, as in 710. For example, a system may receive updated travel related data from various sources (e.g., from UAVs that are flying in the field, from data collection stations, from data aggregators, etc.).

In various implementations, updated travel related data may be received through various types of processes. For example, if a determination is made that a first UAV has deviated from a planned travel route to avoid a location in an area, a second UAV may be sent to collect travel related data regarding the location. In various implementations, such a location may correspond to an obstacle that was not indicated to be at the location by the travel related data that was available at the time when the planned travel route for the first UAV was determined. For example, the obstacle may be at least one of a new structure that has been constructed or equipment that has been moved into the area after the planned travel route was determined. The travel related data that is collected by the second UAV may indicate the location and physical characteristics of the obstacle (e.g., size, shape, dimensions, etc.). Once the travel related data regarding the obstacle is received and recorded, future planned travel routes for other UAVs may be determined which avoid the location based at least in part on the collected travel related data regarding the obstacle. In various implementations, other UAVs may periodically be sent to the location to collect additional travel related data regarding the location. For example, if the additional travel related data indicates that the obstacle is no longer there (e.g., has been moved, taken down, etc.), the additional travel related data may be used to further update the stored travel related data. In various implementations, such checks (e.g., to determine if an obstacle has been removed, etc.) may be performed over certain time increments, which may be made to increase or decrease over time. For example, a UAV may be tasked every $100^{th}$ travel route to go by the location to verify if the obstacle is still there. Over time, if it becomes more certain that the obstacle is relatively permanent, the checks may be performed less frequently (e.g., every 1000$^{th}$ travel route, every 10,000$^{th}$ travel route, etc.).

As another example, a determination may be made that the first UAV deviated from the planned travel route to avoid the location due at least in part to a first condition that was occurring at the first location. In such instances, the updated travel related data may indicate that the location should be avoided when the first condition is occurring. For example, if it is determined that when strong winds are occurring in the area that a microburst of wind tends to occur at the location (e.g., along a line of trees, etc.), the location may be stored as part of the updated travel related data as a location to avoid when a determination is made that strong winds are occurring in the area.

If updated travel related data has been received, a determination is made if the delivery schedule is to be updated, as in 712. If the delivery schedule is to be updated, the example process returns to the block 702. If the delivery schedule is not to be updated, as in 712, or if updated travel related data has not been received, as in 710, the UAVs are deployed according to the delivery schedule, as in 714. In various implementations, the UAVs may be deployed with the optimized flight plans and other data for accomplishing the deliveries. For example, the flight plans may be uploaded to the UAVs, along with certain travel related data (e.g., the most recent obstacle data, crowd data, weather forecast, intermediate landing sites, etc.), along with any other normal flight plan information (e.g., waypoints, etc.).

Figure 8:
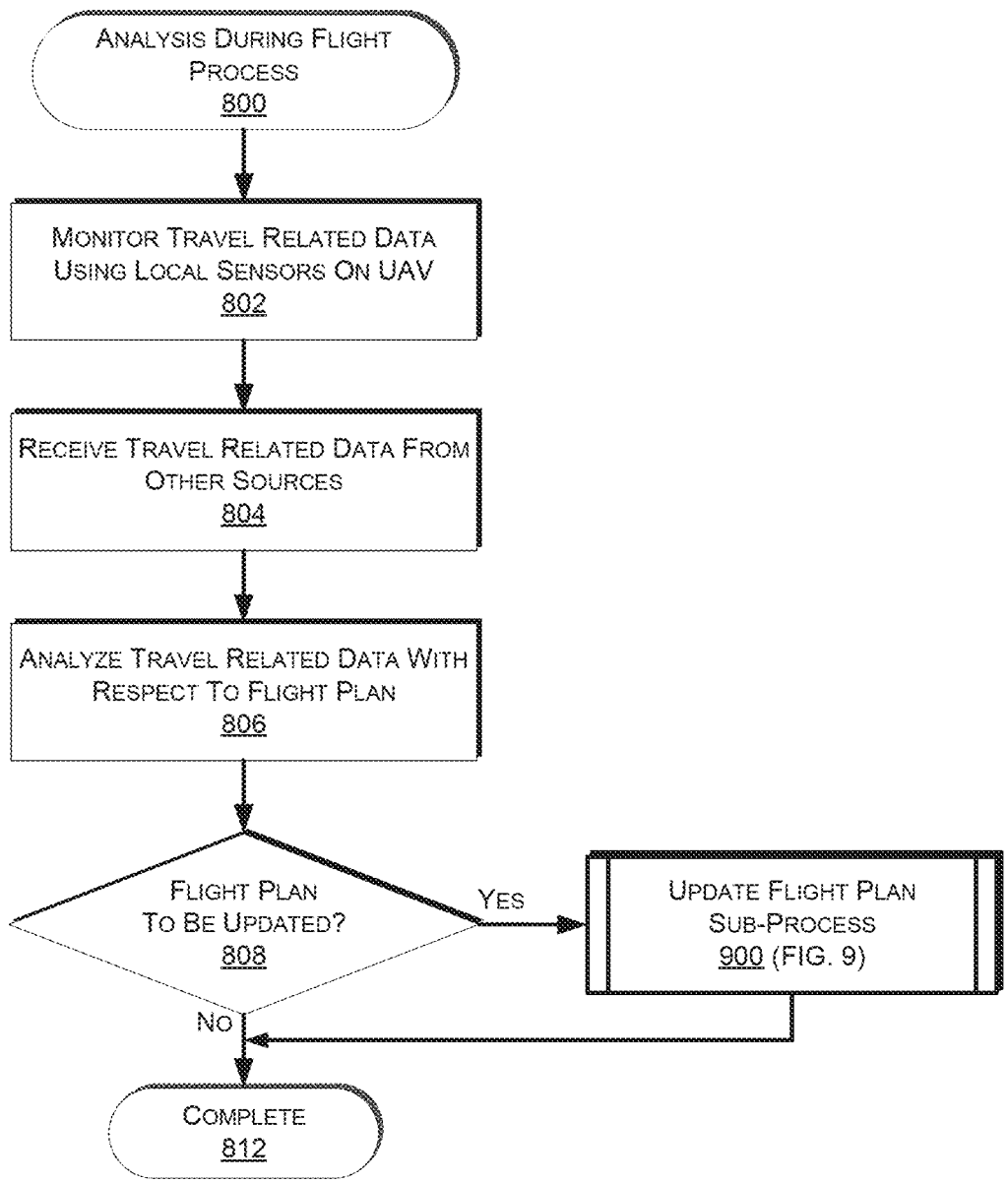
FIG. 8 is a flow diagram illustrating an example process for performing analysis during a flight of an unmanned aerial vehicle, according to some implementations.

FIG. 8 is a flow diagram illustrating an example process 800 for performing analysis during a flight, according to some implementations. The example process begins with monitoring travel related data utilizing local sensors on a UAV, as in 802. In various implementations, the sensors of the UAV may be utilized for obtaining travel related data that pertains to the local environment. For example, an obstacle sensor (e.g., a camera, distance sensor, etc.) may be utilized for detecting obstacles in the flight path of the UAV. As another example, a weather sensor (e.g., a wind speed sensor) may be utilized to determine a wind speed, which may be compared to a threshold value used to modify a flight plan and/or cause the UAV to discontinue flight and seek a nearby landing site. In various implementations, the UAV may send some or all of the local travel related data obtained by the sensors to a central management system 226, or to a data aggregator, etc. The local travel related data may be used by the central management system 226, or the data aggregator, etc. to contribute to a dataset of stored travel related data. The local travel related data may include a timestamp and location data, such as GPS data, etc.

As the travel related data is monitored using the local sensors, travel related data is also received from other sources, as in 804. In various implementations, the travel related data that is received may be current and specific to the location of the UAV. The other sources that the travel related data is received from may include other UAVs or other vehicles that are deployed in a region associated with the delivery, local data collection stations, data aggregators, the central management system 226, etc. In various implementations, a data aggregator may provide aggregated travel related data which may come from various sources, such as the local data collection stations, ground vehicles, other UAVs, and other data aggregators. In various implementations, the travel related data that is received from the other sources may generally be more comprehensive and cover a larger space, while the travel related data that is received from the local sensors of the UAV may be more specific to the current UAV environment and more generally applicable to certain types of more immediate control changes (e.g., swerving to avoid an obstacle, etc.).

As the travel related data is received, the travel related data is analyzed with respect to the current flight plan, as in 806. As part of the analysis, certain types of travel related data from the local sensors may be prioritized over other similar types of travel related data from external sources since the localized travel related data may be more current and may more accurately indicate certain current conditions affecting the UAV. For example, obstacles that are sensed by the sensors of the UAV as being in the travel path of the UAV may be prioritized over general obstacles and terrain related data for the area that is received from a data aggregator. As another example, weather conditions that are sensed by the sensors of the UAV may be considered more relevant than general weather data for the area that is received from a data aggregator.

After the analysis has been performed of the travel related data, a determination is made if the flight plan is to be updated, as in 808. In various implementations, a flight plan which indicates a travel route for a UAV may have originally been determined based on original travel related data (e.g., as received from a UAV or another source that is not a UAV, such as a data aggregator, a local data collection station, a non-UAV vehicle, etc.) An estimated travel time may also have been determined as corresponding to the original flight plan based on the original travel related data. As noted above, additional travel related data that is received (e.g., during a flight of a UAV) may have been provided from a sensor of the UAV, or from other UAVs, or from other sources, etc., and may include information that was not included in the original travel related data. For example, the original travel related data may indicate a weather forecast, a mapping of local obstacles, etc., while the additional travel related data may indicate a weather condition that was not indicated by the weather forecast, or an obstacle that was not indicated by the mapping of local obstacles, etc. As will be described in more detail below, on the basis of the additional travel related data, an updated travel route and corresponding flight plan may be determined, for which an updated estimated travel time may also be determined.

In various implementations, updates to the flight plan may include selection of one or more new waypoints or other changes, possibly including grounding the UAV, if the travel related data indicates that such action is prudent. For example, if the travel route of the current flight plan is blocked by a newly discovered obstacle, or would fly over a crowd of people, or would encounter inclement weather (e.g., heavy rain, high winds, etc.) and/or magnetic interference, etc., a determination may be made to change the heading or otherwise update the flight plan as part of an updated travel route. If the flight plan is to be updated, an update flight plan sub-process is performed, as in 900, as will be described in more detail below with respect to FIG. 9. Once the update flight plan sub-process has been performed, or if the flight plan is not to be updated, as in 808, the example process completes, as in 812.

Figure 9:
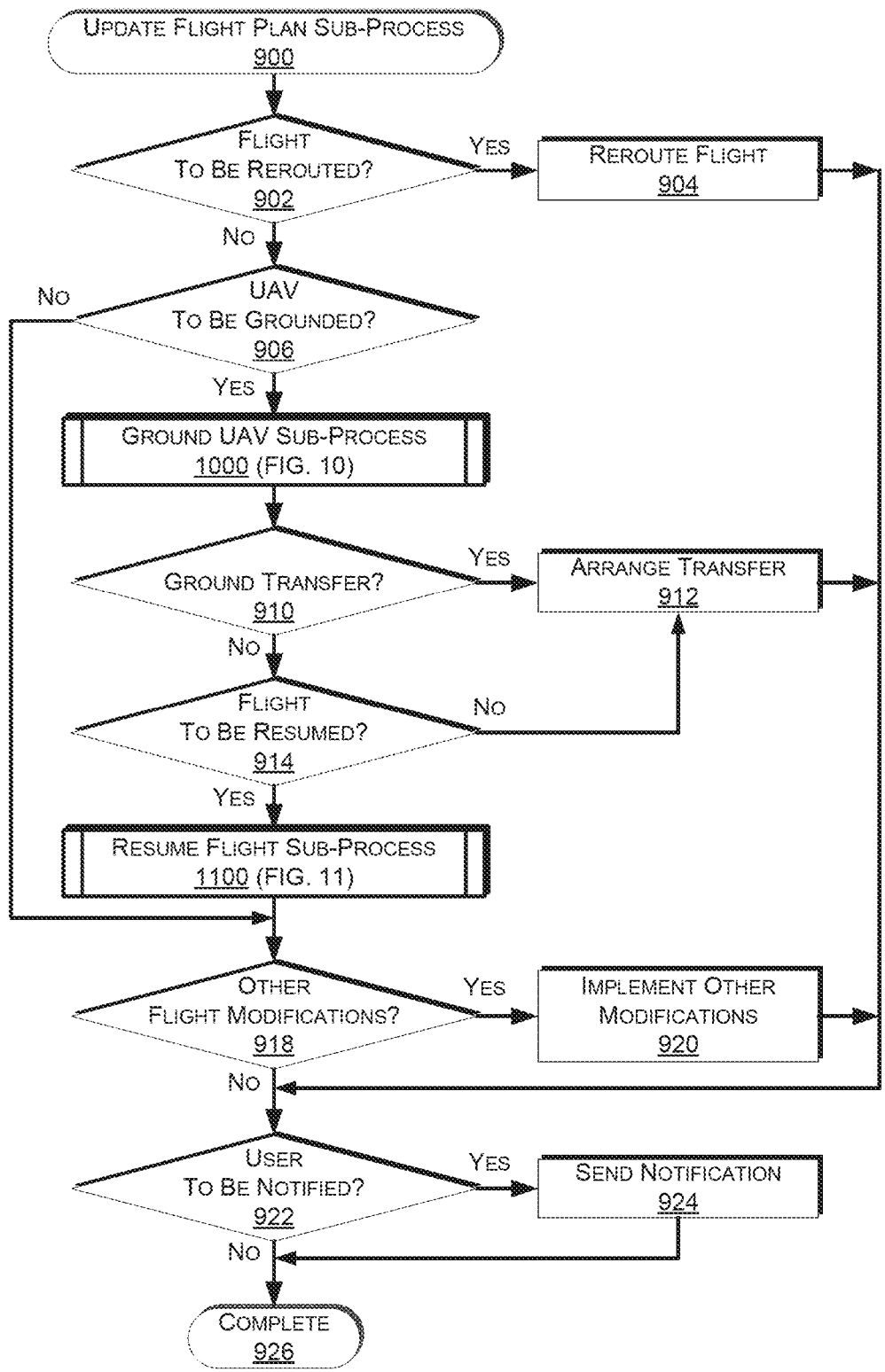
FIG. 9 is a flow diagram illustrating an example sub-process for updating a flight plan for an unmanned aerial vehicle, according to some implementations.

FIG. 9 is a flow diagram illustrating an example sub-process 900 for updating a flight plan, according to some implementations. In various implementations, a flight plan which indicates a travel route for a UAV may have originally been determined based on travel related data (e.g., as stored in a memory of a central management system 226 or a UAV, etc.) As will be described in more detail below, based on additional travel related data (e.g., as provided from the sensors of the UAV, or from other UAVs, or from other sources), the flight plan may be updated, and an updated estimated travel time may also be determined. The example sub-process 900 begins with determining if the flight is to be rerouted, as in 902. If a determination is made that the flight is to be rerouted, then steps are taken to reroute the flight, as in 904. For example, if travel related data indicates that a new obstruction (e.g., a new construction crane) is blocking or inhibiting travel along the current travel route, the flight may be rerouted to go around the obstruction. As another example, if travel related data indicates a dangerous or otherwise undesirable circumstance or condition has developed or exists along a travel route (e.g., if a crowd of people has assembled in an area that the flight route would pass over), the flight may be rerouted to go around the area of concern (e.g., around the area with the crowd of people). As another example, if travel related data indicates adverse weather (e.g., strong winds, precipitation, etc.), the flight may be rerouted to avoid the adverse weather and/or minimize travel through the adverse weather. In various implementations, the rerouting of the flight may also include modifying the travel speed, etc.

If it is determined that the flight is not to be rerouted, as in 902, a determination is made if the UAV is to be grounded, as in 906. For example, if a UAV has entered an area where the travel related data (e.g., from the UAV or other source) indicates that a GPS signal is weak or that magnetic or other interference is preventing certain sensors of the UAV from being able to operate effectively, a determination may be made that the UAV should be grounded. As another example, if a UAV is over a safe landing area (e.g., on top of a building) which travel related data (e.g., from the UAV or other source) indicates has become surrounded with a crowd of people (e.g., due to a concert, a demonstration, etc.), a determination may be made that the UAV should be grounded on top of the building. As another example, if travel related data (e.g., from the UAV or other source) indicates that strong winds or stormy conditions are occurring, a determination may be made that the UAV should be grounded.

If it is determined that the UAV is to be grounded, as in 906, a ground UAV sub-process is performed, as in 1000, as will be described in more detail below with respect to FIG. 10. In general, the grounding of the UAV may in various implementations include landing the UAV at a predetermined nearby landing site or at a suitable landing site determined by surveying the land below (e.g., using image collection and analysis, etc.). Once the UAV has been grounded, a determination is made if a ground transfer is to be performed, as in 910. If a ground transfer is to be performed, a ground transfer is arranged, as in 912. For example, when weather conditions limit flight of the UAV, but do not impact travel by ground vehicles, the UAV may transfer an item to a ground vehicle to complete the delivery. In some implementations, the UAV may also be transported by the ground vehicle.

If a ground transfer is not to be performed, a determination is made if the flight is to be resumed, as in 914. If the flight is not to be resumed, a ground transfer is arranged, as in 912. If the flight is to be resumed, a resumed flight sub-process is performed, as in 1100, as will be described in more detail below with respect to FIG. 11. Once the flight has been resumed, as in 1100, or if the UAV is not to be grounded, as in 906, a determination is made if other flight modifications will be implemented, as in 918. In one implementation, another type of flight modification that might be performed may involve adjusting the speed at which the UAV travels, while the UAV continues to follow the original travel route. For example, if the UAV will need to travel faster or slower to avoid an adverse condition (e.g., a storm that is moving in, a marathon race of runners heading toward a delivery location, etc.) the speed of travel of the UAV may be increased or decreased so as to avoid the adverse condition, etc. If such flight modifications are to be made, the flight modifications are implemented, as in 920.

Once the other modifications are implemented, as in 920, or there are no other flight modifications to be made, as in 918, or after a ground transfer has been arranged, as in 912, or after a flight has been rerouted, as in 904, a determination is made if a user is to be notified, as in 922. The determination of whether a user is to be notified may be based at least in part on whether the UAV has capabilities for sending a notification directly to a user (e.g., via a wireless network) or if the UAV has connectivity to other devices (e.g., such to the central management system 226, another UAV, a ground vehicle, etc.), which may be utilized for sending the notification to the user. If the user is to be notified, a notification is sent to the user, as in 924. In various implementations, the notification may include various types of information for the user. For example, the notification may indicate an estimated amount of delay of the flight or a new delivery time, may indicate a reason for the delay, and/or may enable the user to change the delivery and/or cancel the order. Once a notification has been sent, as in 924, or if the user is not to be notified, as in 922, the example sub-process completes, as in 926.

Figure 10:
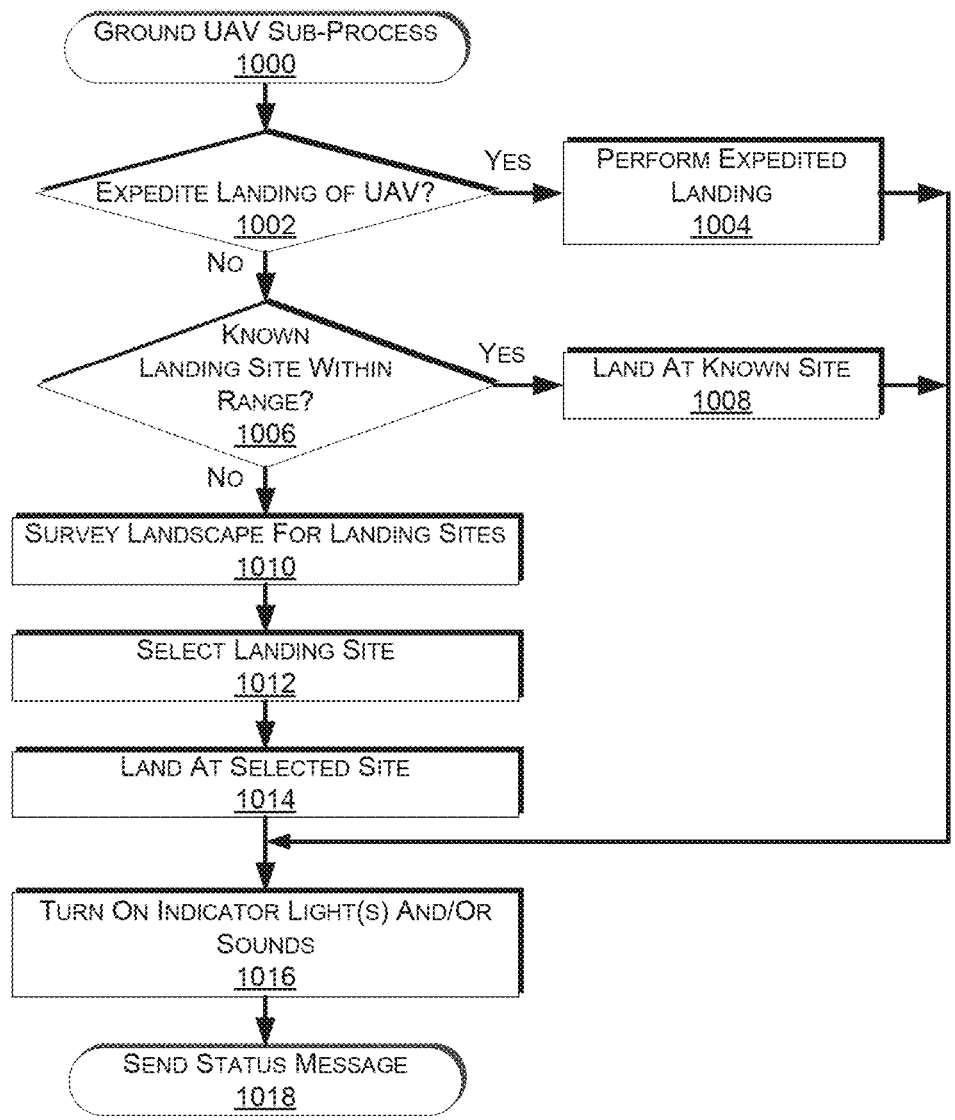
FIG. 10 is a flow diagram illustrating an example sub-process for grounding an unmanned aerial vehicle, according to some implementations.

FIG. 10 is a flow diagram illustrating an example sub-process 1000 for grounding a UAV, according to some implementations. The example sub-process begins with the determining if the landing of the UAV should be expedited. In various implementations, an expedited landing may be performed if it is determined that further flight of the UAV should be limited. For example, if the travel related data indicates that the UAV has flown into an area with unknown or undetected obstacles (e.g., in a construction area with cranes, new structures, etc.), it may be desirable to immediately land the UAV to avoid attempting to further navigate in the area. As another example, if the travel related data indicates that strong winds or a storm is occurring that is currently surrounding the UAV and which makes the navigation uncertain, it may be desirable to land the UAV as soon as possible.

If it is determined that the UAV should be landed through an expedited procedure, an expedited landing is performed, as in 1004. In various implementations, an expedited landing may be made within a shortened time threshold. For example, the time threshold may be based at least in part on the travel related data and the urgency with which the expedited landing should be performed. In various implementations, the landing site for the expedited landing may generally be below the UAV or within sight of the UAV at the time when the expedited landing is to be performed.

If it is determined that an expedited landing will not be performed, as in 1002, a determination is made if a known landing site is within a specified range, as in 1006. In various implementations, the determination of whether a known (e.g., predetermined) landing site is within range of the UAV may include a determination of whether the UAV can travel to the landing site within a time threshold associated with grounding the UAV and/or in a direction that is feasible given the current conditions as indicated by the travel related data. If a known landing site is within range, the UAV is landed at the known site, as in 1008.

If no known landing site is within range, as in 1006, the landscape is surveyed for landing sites, as in 1010. In various implementations, travel related data may be received and/or determined and utilized as part of the surveying process for determining possible landing sites. For example, travel related data (e.g., from the sensors of the UAV, other UAVs, other sources, etc.) may indicate surface features, obstructions, the presence of people, etc., that may be relevant with regard to the selection of a landing site. A landing site may also include a sheltered area or other desirable features with respect to current conditions indicated by the travel related data (e.g., shelter from inclement weather, a location away from people in the area such as on top of a building or other structure, etc.) Once the survey of the landscape has been completed, a landing site is selected, as in 1012.

Once a landing site has been selected, the UAV is landed at the selected site, as in 1014. Once the UAV has landed at the selected site, as in 1014, or if the UAV has landed at a known site, as in 1008, or if an expedited landing has been performed, as in 1004, indicator lights and/or sounds on the UAV are turned on, as in 1016. In various implementations, the indicator lights and/or sounds may provide an indicator of an operability of the UAV. For example, if the UAV is disabled, a first light color/pattern may be initiated (e.g., displaying red lights, etc.) and when the UAV is temporarily grounded, a second light color/pattern may be initiated (e.g., displaying yellow lights, etc.). In some implementations, the lights may provide a readable message to indicate the status to bystanders. In some implementations, the UAV may be equipped with sensors to detect tampering with the UAV by a foreign object. For example, the sensors may cause emission of a distress signal upon determining that a foreign object (e.g., a person, an animal, etc.) is tampering with the UAV.

Once the indicator lights and/or sounds have been turned on, a status message is sent, as in 1018. In various implementations, the status message may be sent to the central management system 226, or to a remote computing resource, or to another device, and/or to a user. A message that is sent to a user may provide a new delivery time or a notification of the delay, and may enable the user to change the delivery and/or cancel the order, etc.

In various implementations, a determination may be made to land the UAV at a destination, such as on property controlled by a user. Communication may be initiated with the user to request permission to land on the property and stay grounded for an estimated amount of time. The grounding may be based on travel related data or other factors. In various implementations, communication with the user may be initiated through the user's Wi-Fi, mobile phone, or other communication device, possibly using information accessible via a user's account (e.g., as accessible by the central management system 226 and/or other computing resource, etc.).

Figure 11:
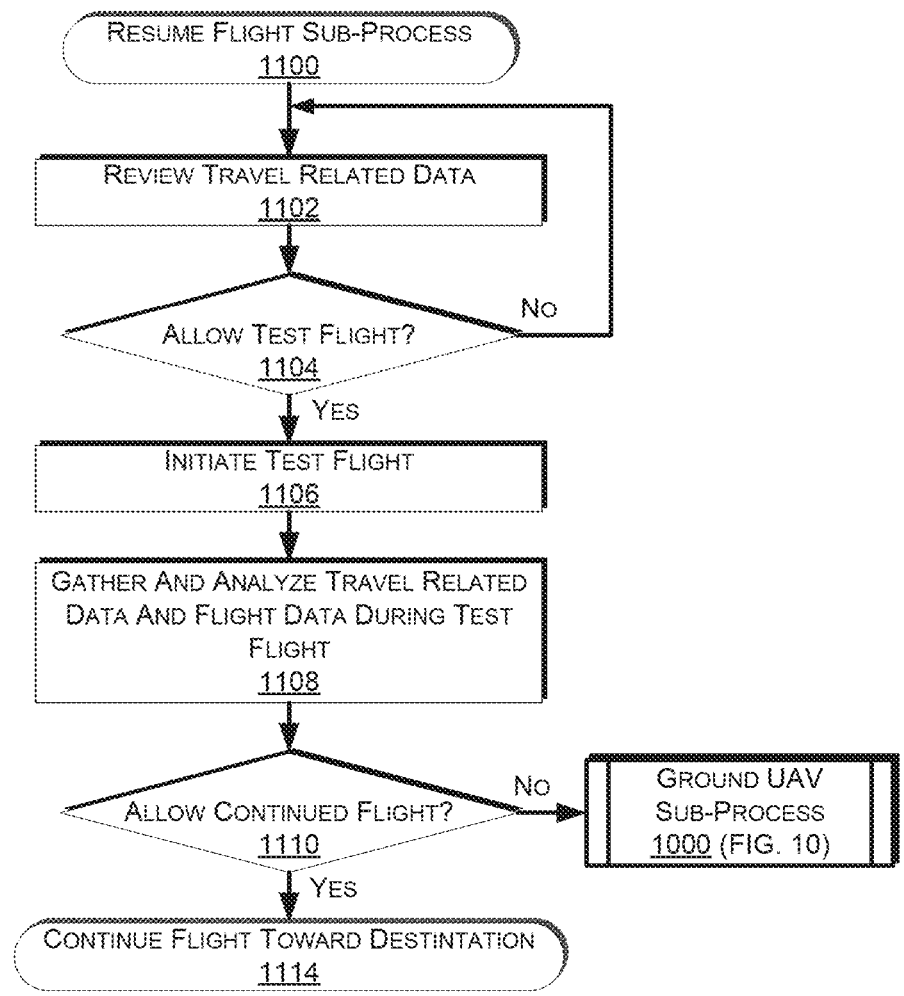
FIG. 11 is a flow diagram illustrating an example sub-process for resuming a flight of an unmanned aerial vehicle, according to some implementations.

FIG. 11 is a flow diagram illustrating an example sub-process 1100 for resuming a flight, according to some implementations. The example sub-process begins with reviewing travel related data, as in 1102. In various implementations, the travel related data may have been updated to indicate that the reason or condition for which a UAV was grounded has changed. For example, if poor GPS signal strength was the reason for grounding the UAV, travel related data may have been received or determined which indicates that the strength of the GPS signal may have improved. As another example, if a UAV was grounded on top of a building to avoid flying over a crowd that had entered the area, travel related data may have been received or determined which indicates that the crowd may have dispersed. As another example, if the UAV was grounded due to poor weather conditions, travel related data may have been received or determined which indicates that the weather conditions may have improved.

Once the travel related data has been reviewed, a determination is made if a test flight will be allowed, as in 1104. For example, an analysis may be performed to determine whether resuming flight is prudent, such as by determining that current conditions as indicated by the current travel related data are within threshold ranges. If a test flight will not be allowed, the process returns to the block 1102, where the travel related data continues to be reviewed as updates become available.

If a test flight is to be allowed, the test flight is initiated, as in 1106. Once the test flight has been initiated, travel related data and flight data are gathered and analyzed during the test flight, as in 1108. In various implementations, the test flight may be staged with checkpoints, at which current conditions may be verified to determine if continued flight is prudent. More specifically, once a UAV has become airborne, at different elevations and/or positions additional data regarding the UAV's ability to safely navigate may further become available. For example, once a UAV has become airborne, sensors of the UAV may be better able to determine if a condition that caused a grounding of the UAV has changed (e.g., if weather has changed, if a crowd has dispersed, etc.). With respect to the weather, the test flight may also allow additional travel related data to be collected in that the landing site may not allow the UAV to experience the same weather that is occurring at higher elevations (e.g., at or near a cruising altitude of the UAV).

Once the travel related data and flight data have been gathered and analyzed, a determination is made if the flight of the UAV will be allowed to continue, as in 1110. In various implementations, the determination of whether the flight will be allowed to continue may be based at least in part on certain safety and/or operational factors. For example, if a condition (e.g., a crowd, weather, magnetic interference, poor GPS signal strength, etc.) that caused a grounding of the UAV is still occurring, it may be considered unsafe to continue flying the UAV. If the flight is not to be continued, the grounding UAV sub-process is performed, as in 1000, which may cause the UAV to be landed at the prior landing site or at a new landing site. If the flight is allowed to continue, the flight is continued toward a destination, as in 1114. In various implementations, the destination may be the prior destination or a new destination (e.g., if the UAV is rerouted and/or the delivery is rescheduled, after the grounding, etc.).

Figure 12:
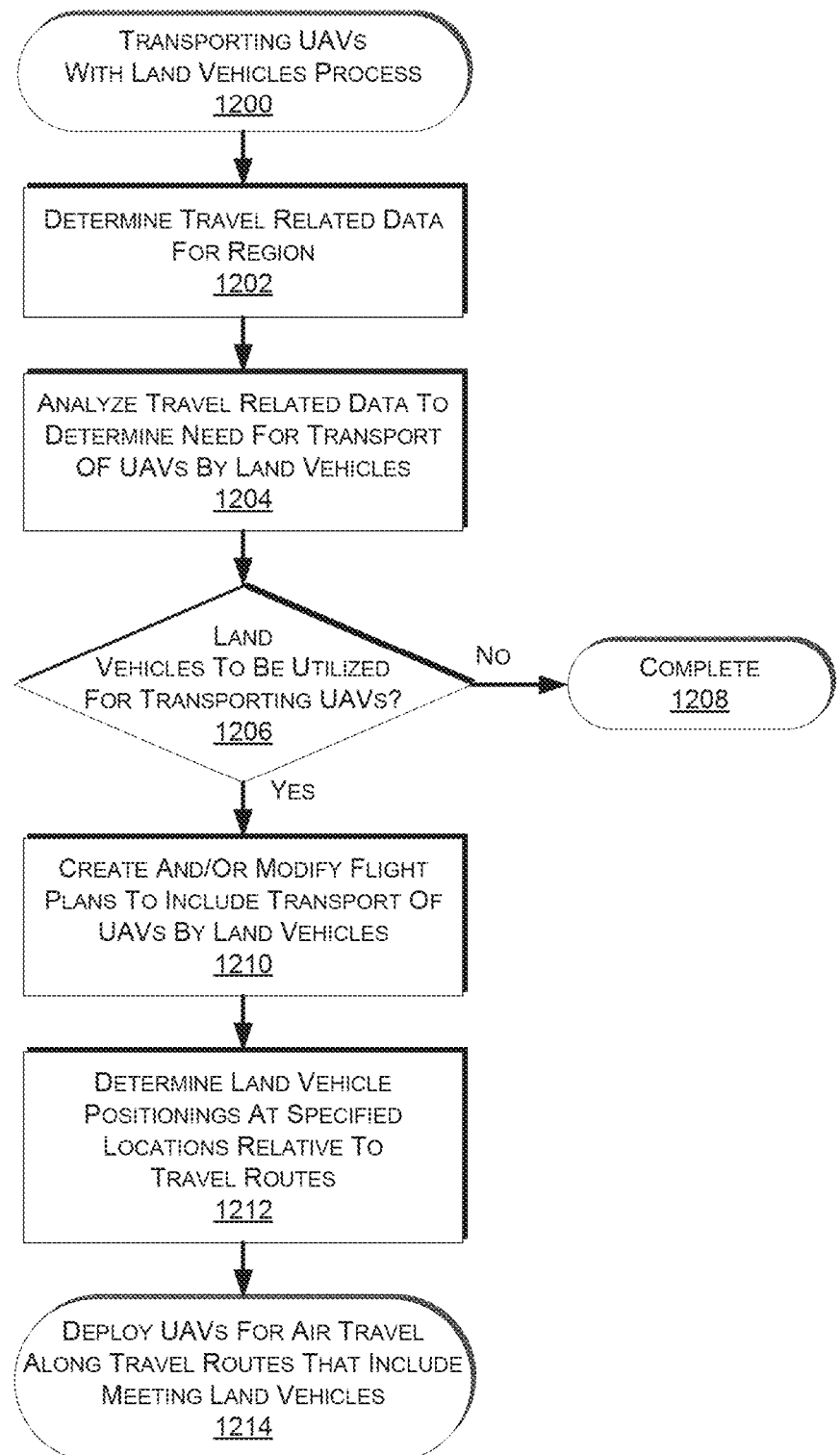
FIG. 12 is a flow diagram illustrating an example process for transporting an unmanned aerial vehicle with a land vehicle, according to some implementations.

FIG. 12 is a flow diagram illustrating an example process 1200 for transporting UAVs with land vehicles, according to some implementations. The example process begins with a determination of travel related data for a region, as in 1202. Once the travel related data has been determined, the travel related data is analyzed to determine a need for transport of UAVs by land vehicles, as in 1204. In various implementations, UAVs may be transported by land vehicles for various reasons such as efficiency, safety, etc. For example, if a UAV is in an area where travel related data indicates that conditions are rapidly changing (e.g., a crowd is forming, obstacles are appearing around the UAV, etc.), it may be desirable to have the UAVs land at a safe area for being further transported by a land vehicle. As another example, for efficiency, it may be desirable to have UAVs fly downwind during a particular portion of a travel route, after which, rather than attempting to fly back upwind, the UAV may be further transported by a land vehicle back to an upwind location. Or, in the alternative, the UAV may continue to fly downwind to another or alternate "return" location if a sufficiently downwind return path is not available. With regard to such wind directions and similar factors, the analysis may involve consideration of travel related data that indicates the relative air currents for a region. The air currents may provide a general direction of air movement which may be leveraged by the UAV, when possible and practical, as part of an optimization process to expedite flight and/or travel using less power resources. The air currents may be specific to a cruising altitude of the UAVs and/or other altitudes. The air currents may also be associated with waypoints and/or other geographical references.

Once the analysis has been performed, a determination is made if land vehicles are to be utilized for transporting UAVs, as in 1206. If it is determined that land vehicles are not to be utilized, the example process completes, as in 1208. If it is determined that land vehicles are to be utilized, the flight plans of the UAVs are created and/or modified for including the transport of the UAVs by the land vehicles, as in 1210. Once the flight plans have been created and/or modified, a determination of the positioning of the land vehicles at specified locations relative to the travel routes of the UAVs are determined, as in 1212. For example, if a UAV is being further transported by a land vehicle for safety reasons, the specified location for the meeting may be near the current location of the UAV. As another example, if the UAV is being further transported by a land vehicle with respect to air current optimizations, the ground vehicle may be positioned at a downwind location, from which the ground vehicle may collect the UAV and transport it to an upwind location. Once the land vehicle positionings have been determined, the UAVs are deployed for air travel along the travel routes that include the meeting locations with the land vehicles, as in 1214.

Figure 13:
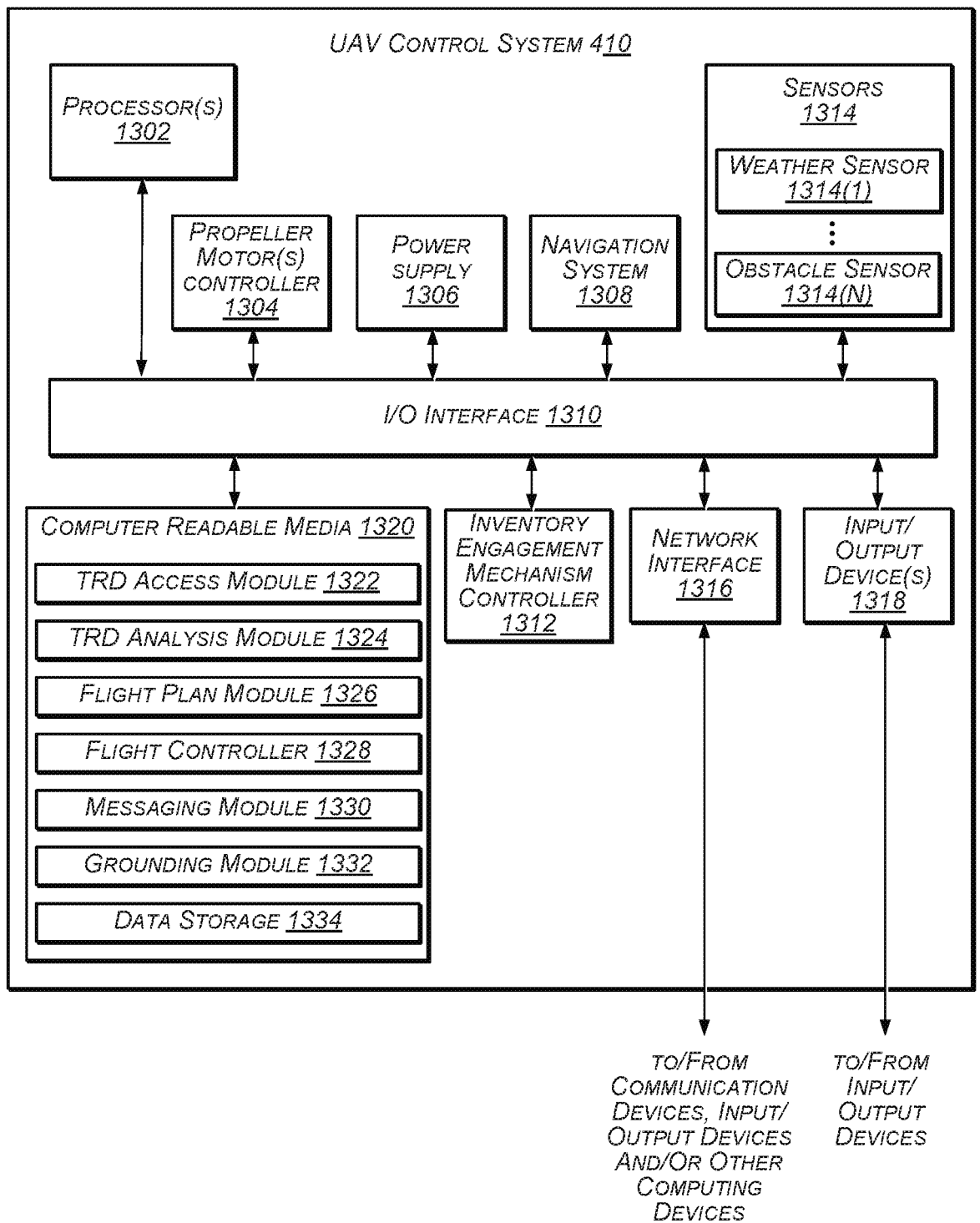
FIG. 13 depicts a block diagram illustrating various components of an unmanned aerial vehicle control system, according to an implementation.

FIG. 13 is a block diagram of an illustrative UAV control system 410 of the UAV 400. The UAV control system 410 may be used to implement the various systems, devices, processes and techniques discussed above. In the illustrated implementation, the UAV control system 410 includes one or more processors 1302, coupled to a non-transitory computer readable media 1320 via an input/output (I/O) interface 1310. The UAV control system 410 may also include a propeller motor controller 1304, power supply module 1306 and/or a navigation system 1308. The UAV control system 410 further includes an inventory engagement mechanism controller 1312, sensors 1314, a network interface 1316, and one or more input/output devices 1318.

In various implementations, the UAV control system 410 may be implemented using a uniprocessor system including one processor 1302, or a multiprocessor system including several processors 1302 (e.g., two, four, eight, or another suitable number). The processor(s) 1302 may be any suitable processor capable of executing instructions. For example, in various implementations, the processor(s) 1302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1302 may commonly, but not necessarily, implement the same ISA.

The non-transitory computer readable media 1320 may be configured to store executable instructions/modules, data, flight paths, and/or data items accessible by the processor(s) 1302. In various implementations, the non-transitory computer readable media 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 1320 or the UAV control system 410. Generally speaking, a non-transitory, computer readable memory may include storage media or memory media such as flash memory (e.g., solid-state memory), magnetic or optical media (e.g., disk) coupled to the UAV control system 410 via the I/O interface 1310. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1316.

In one implementation, the I/O interface 1310 may be configured to coordinate I/O traffic between the processor(s) 1302, the non-transitory computer readable media 1320, and any peripheral devices, the network interface or other peripheral interfaces, such as input/output devices 1318. In some implementations, the I/O interface 1310 may perform any necessary protocol, timing or other data transformations to convert data signals from one component (e.g., non-transitory computer readable media 1320) into a format suitable for use by another component (e.g., processor(s) 1302). In some implementations, the I/O interface 1310 may include support for devices attached through various types of peripheral buses, such as a variant of the Peripheral Component Interconnect (PCI) bus standard or the Universal Serial Bus (USB) standard, for example. In some implementations, the function of the I/O interface 1310 may be split into two or more separate components, such as a north bridge and a south bridge, for example. Also, in some implementations, some or all of the functionality of the I/O interface 1310, such as an interface to the non-transitory computer readable media 1320, may be incorporated directly into the processor(s) 1302. The propeller motor(s) controller 1304 communicates with the navigation system 1308 and adjusts the power of each propeller motor to guide the UAV along a determined travel route. The power supply module 1306 may control the charging and any switching functions associated with one or more power modules (e.g., batteries) of the UAV.

The navigation system 1308 may include a GPS or other similar system that can be used to navigate the UAV to and/or from a location. The inventory engagement mechanism controller 1312 communicates with the actuator(s) or motor(s) (e.g., a servo motor) used to engage and/or disengage inventory. For example, when the UAV is positioned over a level surface at a delivery location, the inventory engagement mechanism controller 1312 may provide an instruction to a motor that controls the inventory engagement mechanism to release the inventory.

The sensors 1314 onboard the UAV 400 may capture local travel related data. In various implementations, different types of sensors may be provided, such as weather sensors 1314(1), obstacle sensors 1314(N), etc. The weather sensors 1314(1) may capture wind direction, wind speed, perception amounts, temperature, and/or weather information as the UAV is in transit and/or while the UAV is grounded. One type of weather sensor may include a wind sensor, which may use a pitot tube and static port to determine a speed of wind. Another type of weather sensor may include a precipitation sensor to measure precipitation. The weather sensors 1314(1) may also include other sensors to measure temperature, thermal conditions, fog or visibility, pressure, airflow, and/or other weather attributes. An obstacle sensor 1314(N) (e.g., an image sensor, distance sensor, etc.) may be utilized for determining the presence of an obstacle (e.g., a construction crane, a new building, a tree, etc.). It will be appreciated that various other types of sensors (e.g., image sensors, etc.) may also be included in the UAV for sensing travel related data, etc.

The network interface 1316 may be configured to allow data to be exchanged between the UAV control system 410, other devices attached to a network, such as other computer systems, and/or with UAV control systems of other UAVs. For example, the network interface 1316 may enable wireless communication between numerous UAVs. In various implementations, the network interface 1316 may support communication via wireless general data networks, such as a Wi-Fi network. For example, the network interface 1316 may support communication via telecommunications networks such as cellular communication networks, satellite networks, and the like.

Input/output devices 1318 may, in some implementations, include image capture devices, infrared sensors, time of flight sensors, accelerometers, lights, speakers, and other input/output devices commonly used in aviation. Multiple input/output devices 1318 may be present and controlled by the UAV control system 410. One or more of the sensors may be utilized to assist in landings as well as avoiding obstacles during flight, and in various implementations may be included with the sensors 1314.

In some implementations, the computer readable media 1320 may store a travel related data (TRD) access module 1322, a TRD analysis module 1324, a flight plan module 1326, a flight controller 1328, a messaging module 1330, and a grounding module 1332, which are described in turn. The components may be stored together or in a distributed arrangement. The computer readable memory may also store data 1334, such as travel related data, a flight plan, waypoints, predetermined landing sites, and other data.

The TRD access module 1322 may receive travel related data from the sensors 1314, the data storage 1334, and/or other external sources, such as the other UAVs 400, the local data collection stations 318, the ground vehicles 320, and/or the data aggregators 322, possibly via the central management system 226.

The TRD analysis module 1324 may aggregate and/or analyze the travel related data. Resulting data produced by the TRD analysis module 1324 may be used to update flight plans, cause the UAV to be grounded, change operation by the flight controller, and/or cause other actions.

The flight plan module 1326 may receive, maintain, update, and/or create a flight plan for use by the UAV, implemented by the flight controller 1328 and navigation system. The flight plan module 1326 may receive inputs from the TRD analysis module 1324 and update the flight plan (or create a new one) accordingly, which may include different waypoints and/or other different navigational information based on results/data from the TRD analysis module 1324.

The flight controller 1328 may implement the flight plan as well as control the UAV in accordance with the navigation system. The flight controller 1328 may make changes in a direction or conduct of flight based on the information from the TRD analysis module 1324 without necessarily receiving a change in the flight plan.

The messaging module 1330 may transmit messaging to the user, directly or indirectly (through the central management system), based on changes to the flight plan and/or grounding of the UAV. For example, the messaging module 1330 may transmit a message to a user associated with an item to be delivered by the UAV to indicate a change in a delivery time window, and/or other changes.

The grounding module 1332 may assist the flight controller 1328 in grounding/landing the UAV. The grounding module 1332 may select a landing site from predetermined landing sites and/or using a real time landing site selection process, which may leverage computer vision from images gathered by an imaging device of the UAV 400. The grounding module 1332 may also implement a protocol to execute a test flight and/or to resume a flight.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 410 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 410 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 410. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 410 may be transmitted to the UAV control system 410 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. In various implementations, the previously described flow diagrams are implemented at least in part by the operations of the modules of the UAV control system 410.

Figure 14:
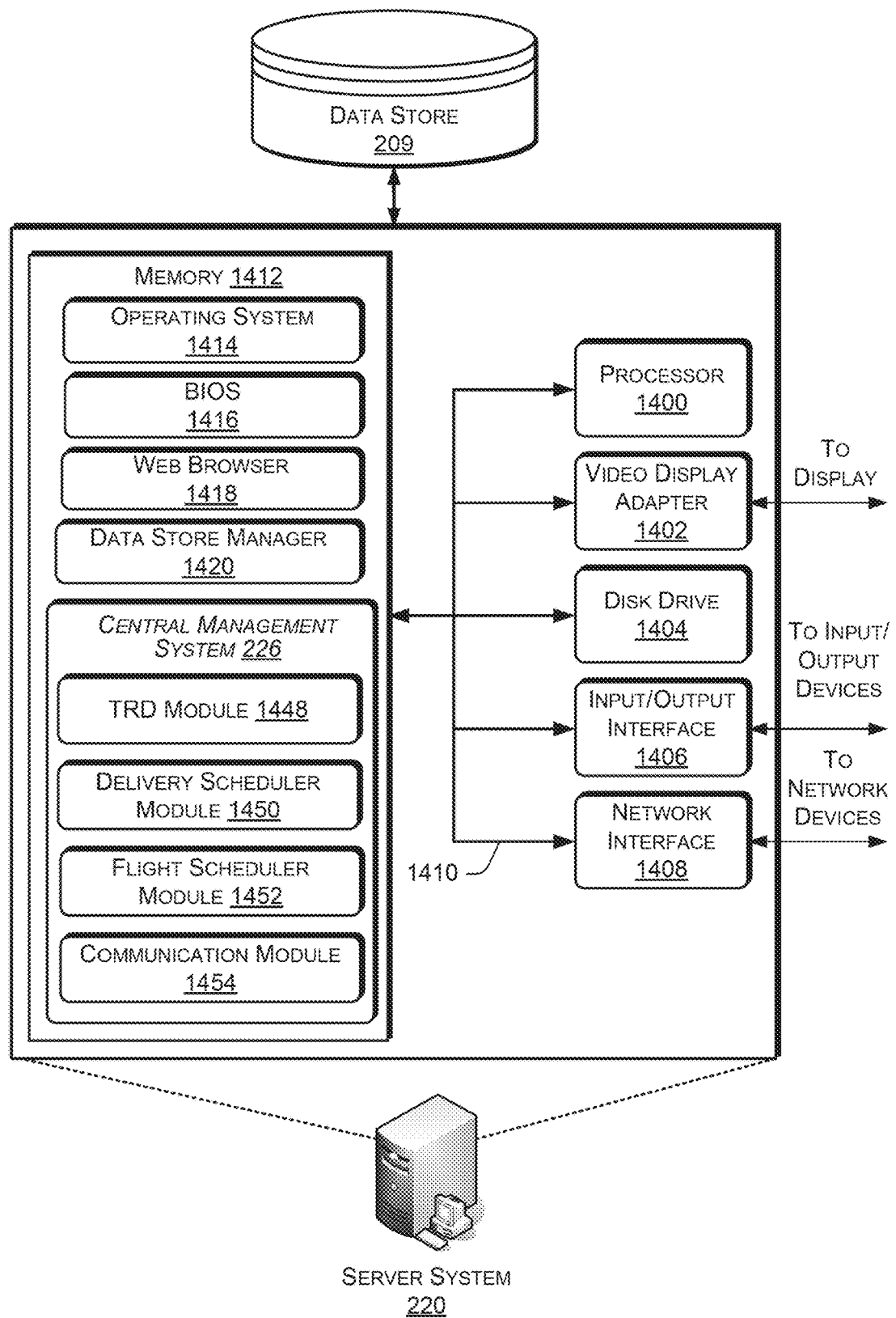
FIG. 14 is a block diagram of an illustrative implementation of a server system that may be used with various implementations.

FIG. 14 is a block diagram of an illustrative implementation of a server system, such as the server system 220, which may be used in the implementations described herein. The server system 220 may be used to implement the various systems, processes and techniques described above. The server system 220 may include a processor 1400, such as one or more redundant processors, a video display adapter 1402, a disk drive 1404, an input/output interface 1406, a network interface 1408, and a memory 1412. The processor 1400, the video display adapter 1402, the disk drive 1404, the input/output interface 1406, the network interface 1408, and the memory 1412 may be communicatively coupled to each other by a communication bus 1410.

The video display adapter 1402 provides display signals to a local display (not shown in FIG. 14) permitting an agent of the server system 220 to monitor and configure operation of the server system 220 and/or to provide information (e.g., regarding travel related data, etc.). The input/output interface 1406 likewise communicates with external input/output devices not shown in FIG. 14, such as a mouse, keyboard, scanner, or other input and output devices that can be operated by an agent of the server system 220. The network interface 1408 includes hardware, software, or any combination thereof, to communicate with other computing devices. For example, the network interface 1408 may be configured to provide communications between the server system 220 and other computing devices, such as that of a UAV 400, central management system 226, etc., via a network.

The memory 1412 generally comprises random access memory (RAM), read-only memory (ROM), flash memory, and/or other volatile or permanent memory. The memory 1412 is shown storing an operating system 1414 for controlling the operation of the server system 220. A binary input/output system (BIOS) 1416 for controlling the low-level operation of the server system 220 is also stored in the memory 1412.

The memory 1412 additionally stores program code and data for providing network services to the UAV 400 and/or central management system 226. Accordingly, the memory 1412 may store a browser application 1418. The browser application 1418 comprises computer executable instructions, that, when executed by the processor 14(00 generate or otherwise obtain configurable markup documents such as Web pages. The browser application 1418 communicates with a data store manager application 1420 to facilitate data exchange between the data store 209 and the central management system 226.

As used herein, the term "data store" refers to any device or combination of devices capable of storing, accessing, and retrieving data, which may include any combination and number of data servers, databases, data storage devices and data storage media, in any standard, distributed or clustered environment. The server system 220 can include any appropriate hardware and software for integrating with the data store 209 as needed to execute aspects of one or more applications for a UAV 400 and/or central management system 226.

The data store 209 can include several separate data tables, databases or other data storage mechanisms and media for storing data relating to a particular aspect. For example, the illustrated data store 209 includes mechanisms for maintaining information related to operations, inventory, maps. GPS data, other travel related data, etc., which can be used to generate and deliver information to a UAV 400, central management system 226, and/or agents. It should be understood that there may be additional aspects that can be stored in the data store 209 and that additional data stores beyond the one illustrated may be included. The data store 209 is operable, through logic associated therewith, to receive instructions from the server system 220 and obtain, update or otherwise process data in response thereto.

The memory 1412 may also include the central management system 226, discussed above. The central management system 226 may be executable by the processor 1400 to implement one or more of the functions of the server system 220. In one implementation, the central management system 226 may represent instructions embodied in one or more software programs stored in the memory 1412. In another implementation, the central management system 226 can represent hardware, software instructions, or a combination thereof.

In various implementations, the central management system 226 may include a TRD module 1448, a delivery scheduler module 1450, a flight scheduler module 1452, and a communication module 1454. The modules may be stored together or in a distributed arrangement. The data store 209 may include a flight plan, schedules for UAVs and/or other vehicles, travel related data, orders, fleet information, and/or other relevant data.

The TRD module 1448 may receive travel related data from one or more different sources, such as the UAV 400 (e.g., via onboard sensors), other UAVs, ground vehicles, data aggregators, weather stations, etc. The TRD module 1448 may then processes this information for use by other modules that may use travel related data in decision-making operations. In some implementations, the TRD module 1448 may receive travel related data from various different locations, such as from UAVs, ground vehicles, weather stations, etc. The TRD module 1448 may aggregate and extrapolate this information to create predictions for travel related data in other areas not currently sampled as well as forecast travel related data in some areas. For example, with respect to weather, the TRD module 1448 may leverage historical information about past occurrences of squalls, microbursts of weather, and/or other weather occurrences that may include precipitation, fog, air temperatures below freezing, high winds, downdrafts, and/or other weather that may disrupt travel by a UAV. The TRD module 1448 may provide location specific information to other devices, such as the UAV 400, as well as regional information. The location specific information may be specific to a route to be traveled by the UAV and/or alternative routes that can be used by the UAV.

The delivery scheduler module 1450 may determine a type of delivery for a specific order, which may be determined based on a user selection at a time of the order or after the order. The delivery scheduler module 1450 may provide different delivery options for selection. The delivery scheduler module 1450 may determine travel related data from the TRD module 1448 and output delivery estimates based on the travel related data. For example, for a given order, the delivery scheduler module 1450 may determine a time window for delivery to an address by UAV based on travel related data from the TRD module 1448. The flight scheduler module 1452 may schedule UAVs to perform the deliveries based at least in part on the output from the delivery scheduler module 1450 and the TRD module 1448. In various implementations, the flight scheduler module 1452 may select certain UAVs to perform certain deliveries based on the travel related data provided by the TRD module 1448. For example, UAVs that are better able to navigate may be sent into areas with a significant number of obstacles, and/or in which more obstacles continue to be discovered. As another example, UAVs that are safer for navigating over or around people may be sent on deliveries that require navigation over or around an area with people. As another example, larger UAVs may be assigned to perform flights that may experience greater winds and/or precipitation.

The communication module 1454 may facilitate communications between UAVs, as well as with users. For example, the communication module 1454 may provide an update to a user of a delivery time window in response to travel related data from the TRD module 1448 and/or from a message received from the UAV, such as a UAV that has been grounded (e.g., due to bad weather, crowds, heavy magnetic interference, poor GPS signal, etc.). In some implementations, the communication module 1454 may enable a user to change a delivery type, cancel an order, and/or make other selections based on a status of a flight of a UAV and/or other considerations. In various implementations, the previously described flow diagrams are implemented at least in part by the operations of the modules of the central management system 226.

The server system 220, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction in FIG. 14 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system to deliver an item to a delivery location, the system comprising:
    a first unmanned aerial vehicle (UAV);
    a second UAV, comprising:
        a propulsion system; and
        a sensor; and
    a computing system, including:
        one or more processors; and
        a memory coupled to the one or more processors and storing program instructions that when executed by the one or more processors cause the one or more processors to at least:
            receive first travel related data from a data aggregator that collects and provides data;
            schedule a delivery of an item to a delivery location, wherein the scheduling of the delivery includes selecting a first materials handling facility from a plurality of materials handling facilities to fulfill the item based at least in part on the first travel related data;
            receive second travel related data that indicates a condition in an area that is beneath a first travel route and that the first UAV would fly over as part of a first flight plan to deliver the item from the first materials handling facility to the delivery location; and
            based on an analysis of the second travel related data, select a second materials handling facility from the plurality of materials handling facilities to fulfill the item, wherein the second UAV will fly along a second travel route that is indicated by a second flight plan for the second UAV to deliver the item from the second materials handling facility to the delivery location.

2. The system of claim 1, wherein the first travel related data that is received from the data aggregator indicates at least one of an obstacle, a weather condition, a local GPS signal strength, a magnetic interference, a construction activity, or a crowd of people, and the second travel related data is received from a UAV.

3. The system of claim 1, wherein the program instructions when executed by the one or more processors further cause the one or more processors to send a notification to a user, the notification including an updated estimated delivery time based at least in part on the second flight plan.

4. The system of claim 1, wherein the condition in the area is that there are people present in the area.

5. The system of claim 1, wherein the program instructions when executed by the one or more processors further cause the one or more processors to:
    determine a first estimated travel time for the first UAV to deliver the item to the delivery location based at least in part on the first flight plan for the first UAV; and determine a second estimated travel time for the second UAV to deliver the item to the delivery location based at least in part on the second flight plan.

6. The system of claim 5, wherein the program instructions when executed by the one or more processors further cause the one or more processors to send a notification to a user including an updated estimated delivery time based at least in part on the second estimated travel time.

7. The system of claim 6, wherein the program instructions when executed by the one or more processors further cause the one or more processors to send a notification to a user including an original estimated delivery time.

8. A computer implemented method for an unmanned aerial vehicle (UAV) to deliver an item to a delivery location, the computer implemented method comprising:
under control of one or more computing systems configured with executable instructions, receiving first travel related data from a first source;
scheduling a delivery of an item to a delivery location, wherein the scheduling of the delivery includes selecting a first materials handling facility from a plurality of materials handling facilities to fulfill the item based at least in part on the first travel related data;
receiving second travel related data, wherein the second travel related data includes information that is not included in the first travel related data and indicates a condition in an area that is beneath a first travel route and that a first UAV would fly over as part of a first flight plan to deliver the item from the first materials handling facility to the delivery location;
based on an analysis of the second travel related data, selecting a second materials handling facility from the plurality of materials handling facilities to fulfill the item and for which a second UAV will fly along a second travel route that is indicated by a second flight plan for the second UAV to deliver the item from the second materials handling facility to the delivery location; and
controlling the second UAV to travel along the second travel route to deliver the item from the second materials handling facility to the delivery location.

9. The computer implemented method of claim 8, wherein the first source comprises at least one of a data aggregator, a local data collection station, or a vehicle that is not a UAV, and the second travel related data is received from a UAV.

10. The computer implemented method of claim 8, wherein the condition in the area is that there are people present in the area.

11. The computer implemented method of claim 8, further comprising:
determining a first estimated travel time for the first UAV to deliver the item to the delivery location based at least in part on the first flight plan for the first UAV; and
determining a second estimated travel time for the second UAV to deliver the item to the delivery location based at least in part on the second flight plan.

12. The computer implemented method of claim 11, further comprising sending a notification to a user including an updated estimated delivery time based at least in part on the second estimated travel time.

13. The computer implemented method of claim 12, further comprising sending a notification to the user including an original estimated delivery time.

14. A computer implemented method for an unmanned aerial vehicle (UAV) to deliver an item to a delivery location, the computer implemented method comprising:
under control of one or more computing systems configured with executable instructions,
scheduling a delivery of an item to a delivery location, wherein the scheduling of the delivery includes selecting a first materials handling facility from a plurality of materials handling facilities to fulfill the item;
receiving travel related data that indicates a condition in an area that is beneath a first travel route and that a first UAV would fly over as part of a first flight plan to deliver the item from the first materials handling facility to the delivery location;
based at least in part on the travel related data, selecting a second materials handling facility from the plurality of materials handling facilities to fulfill the item and for which a second UAV will fly along a second travel route that is indicated by a second flight plan for the second UAV to deliver the item from the second materials handling facility to the delivery location; and
flying the second UAV according to the second flight plan to deliver the item from the second materials handling facility to the delivery location.

15. The computer implemented method of claim 14, wherein the condition in the area is that there are people present in the area.

16. The computer implemented method of claim 15, wherein the people present in the area comprise a crowd of people, and the second travel related data includes at least one of:
a characteristic regarding the size of the crowd; or
a characteristic regarding the area covered by the crowd.

17. The computer implemented method of claim 15, wherein the people present in the area comprise a crowd of people, and the second travel related data includes at least one of:
an indication that the crowd is increasing;
an indication that the crowd is decreasing; or
an indication of a direction of movement of the crowd.

18. The computer implemented method of claim 14, further comprising:
determining a first estimated travel time for the first UAV to deliver the item to the delivery location based at least in part on the first flight plan for the first UAV; and
determining a second estimated travel time for the second UAV to deliver the item to the delivery location based at least in part on the second flight plan.

19. The computer implemented method of claim 18, further comprising sending a notification to a user including an updated estimated delivery time based at least in part on the second estimated travel time.

20. The computer implemented method of claim 19, further comprising sending a notification to the user including an original estimated delivery time.

21. The computer implemented method of claim 14, wherein the travel related data is received from a UAV.

* * * * *